United States Patent
Nara et al.

(10) Patent No.: US 7,133,587 B2
(45) Date of Patent: Nov. 7, 2006

(54) DISPERSION COMPENSATOR, METHOD FOR MANUFACTURING THE SAME, AND METHOD FOR COMPENSATING WAVELENGTH DISPERSION

(75) Inventors: Kazutaka Nara, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/416,200

(22) Filed: May 3, 2006

(65) Prior Publication Data

US 2006/0193558 A1    Aug. 31, 2006

Related U.S. Application Data

(63) Continuation of application No. 10/347,370, filed on Jan. 21, 2003, now Pat. No. 7,072,545.

(30) Foreign Application Priority Data

Jan. 21, 2002 (JP) ................................ 2002-11621
Jul. 12, 2002 (JP) ................................ 2002-204333

(51) Int. Cl.
*G02B 6/34* (2006.01)
*H04J 14/02* (2006.01)
*H01L 21/00* (2006.01)

(52) U.S. Cl. .................. 385/37; 385/129; 385/130; 385/131; 385/14; 385/3; 398/81; 438/29; 438/31; 438/32

(58) Field of Classification Search ............... 385/3, 385/7, 10, 14, 129, 130, 131, 123; 398/79, 398/80, 81, 82; 438/31, 32, 29
See application file for complete search history.

(56) References Cited

U.S. PATENT DOCUMENTS

| 6,122,419 | A | 9/2000 | Kurokawa et al. ............ 359/31 |
| 6,882,778 | B1 * | 4/2005 | Fondeur et al. ............... 385/37 |
| 2002/0159701 | A1 | 10/2002 | Katayama et al. ............ 385/39 |
| 2002/0181869 | A1 | 12/2002 | Lin ............................... 385/37 |
| 2003/0091265 | A1 | 5/2003 | Lin et al. ...................... 385/15 |
| 2004/0028367 | A1 * | 2/2004 | Nara et al. ................... 385/130 |

FOREIGN PATENT DOCUMENTS

| JP | 5-303019 | 11/1993 |
| JP | 6-331842 | 12/1994 |
| JP | 07-333446 | 12/1995 |
| JP | 2002-131658 | 5/2002 |

* cited by examiner

*Primary Examiner*—Brian M. Healy
(74) *Attorney, Agent, or Firm*—Oblon, Spivak, McClelland, Maier & Neustadt, P.C.

(57) ABSTRACT

A dispersion compensator includes at least one first optical waveguide, a first slab waveguide, an arrayed waveguide connected to the at least one first optical waveguide via the first slab waveguide, a second slab waveguide, at least one second optical waveguide connected to the arrayed waveguide via the second slab waveguide, and a phase distribution provider configured to provide a phase distribution to the arrayed waveguide.

52 Claims, 15 Drawing Sheets

DISPERSION COMPENSATOR, METHOD FOR MANUFACTURING THE SAME, AND METHOD FOR COMPENSATING WAVELENGTH DISPERSION

CROSS REFERENCE TO RELATED APPLICATIONS

This application is a continuation of application Ser. No. 10/347,370 (the parent application), filed Jan. 21, 2003 now U.S. Pat. No. 7,072,545, which claims priority to Japanese Application No. 2002-204333, filed Jul. 12, 2002 and Japanese Application 2002-011621, filed Jan. 21, 2002. The entire content of the parent application is incorporated herein by reference.

BACKGROUND OF THE INVENTION

1. Field of the Invention

The present invention relates to a dispersion compensator, a dispersion compensator system, a method for manufacturing the dispersion compensator, and a method for compensating wavelength dispersion in an optical transmission path.

2. Discussion of the Background

In general, an optical transmission path through which optical communication (optical transmission) is carried out has a positive wavelength dispersion in an optical transmission band. Conventionally, in order to suppress a signal light distortion due to the wavelength dispersion, a dispersion compensation optical fiber including a negative wavelength dispersion in the optical transmission band is connected to the optical transmission path, to thereby compensate the wavelength dispersion in the optical transmission path.

The dispersion compensation technology described above has proceeded toward practical use in an optical transmission having a 10 Gbit/s or less of a transmission speed of a signal light. However, while having tried to have 40 Gbit/s or more of the transmission speed of the signal light for the future use, more precise dispersion compensation is required to respond to 40 Gbit/s or more of the transmission speed. Further, more reliable optical transmission can be achieved if more precise dispersion compensation technology is applied to communication having the transmission speed of at most 10 Gbit/s.

In the dispersion compensation optical fiber described above, an amount of the dispersion compensation is adjusted by changing the length of the optical fiber. Accordingly, since it is difficult to conduct an accurate dispersion compensation less than several tens psec/nm, the dispersion compensation in the high speed transmission described above was difficult. Also, in order to conduct the dispersion compensation of the optical transmission path by the dispersion compensation optical fiber, dispersion compensation optical fibers having lengths corresponding to the dispersion of respective optical paths need to be formed in correspondence to the dispersion of the respective optical paths. Thus, in view of the cost, it is not preferable.

Therefore, considering the above problems, in recent years, there has been studied a variable dispersion compensator in which a dispersion value can be changed.

As an example of the variable dispersion compensator, a Lattice type filter 24 as shown in FIG. 16 has been proposed. The variable dispersion compensator was proposed by K. Takiguchi et al in 1996, and this variable dispersion compensator include a combination of a plurality of Mach-Zehnder interferometers 30.

In FIG. 16, a plurality of Mach-Zehnder interferometers 30 are connected in series, and phase sections of the respective Mach-Zehnder interferometers are provided with thermooptic phase shifters 31. Also, each connecting section of adjacent Mach-Zehnder interferometers 30 is provided with a variable coupler 33. In this variable dispersion compensator, the wavelength dispersion can be changed in a range of +786 psec/nm to −681 psec/nm.

Also, in 2000, F. Horst et al proposed a variable dispersion compensator combined with a ring resonator. In this variable dispersion compensator, the wavelength dispersion can be changed in a range of +1350 psec/nm to −3430 psec/nm.

In the variable dispersion compensator combined with the ring resonator, however, the free spectral range (FSR) becomes small, and the effect of the filter characteristic is given to the wavelength other than the wavelength which needs to be compensated.

Therefore, in order to solve the problem in the free spectral range, K. Takiguchi et al proposed a variable dispersion compensator as shown in FIG. 17 in 2000. In this variable dispersion compensator, as shown in FIG. 17, the Lattice type filter 24 shown in FIG. 16 is connected to an arrayed waveguide grating 11. K. Takiguchi et al stated that the variable dispersion compensator shown in FIG. 17 can eliminate the effect of the free spectral range.

Incidentally, the arrayed waveguide grating 11 is structured by forming a waveguide forming region 10 on a substrate 1, and includes a waveguide structure shown in FIG. 17, for example.

The waveguide structure of the arrayed waveguide grating 11 includes optical input waveguides 2, a first slab waveguide 3 connected to an output side of the optical input waveguides 2, an arrayed waveguide 4 connected to an output side of the first slab waveguide 3, a second slab waveguide 5 connected to an output side of the arrayed waveguide 4, and a plurality of optical output waveguides 6 connected to an output side of the second slab waveguide 5.

The arrayed waveguide 4 propagates a light that has been led from the first slab waveguide 3, and is formed by arranging a plurality of channel waveguides (4a) side by side. Lengths of the adjacent channel waveguides (4a) vary from each other by a predetermined length (ΔL).

Incidentally, a large number, normally 100, of the channel waveguides (4a) forming the arrayed waveguide 4 are provided. However, in FIG. 17, the number of the channel waveguides (4a) is schematically depicted to simplify the drawing.

In the variable dispersion compensator shown in FIG. 17, output ends of the optical output waveguide 6 of the arrayed waveguide grating 11 are connected to an optical fiber array 21, and a plurality of optical fibers 22 connected to the fiber array 21 are connected to the lattice type filter 24 through an optical fiber array 23.

One end of each optical fiber 22 is connected to the corresponding optical output waveguide 6 in the arrayed waveguide grating 11, and the other end of each optical fiber 22 is connected to the corresponding optical input waveguide 9 in the Lattice type filter 24.

However, the variable dispersion compensator shown in FIG. 17 has a cumbersome structure, resulting in increasing the cost thereof. Also, since only lights having the frequency interval of the arrayed waveguide grating 11 can be multiplexed in this dispersion compensator, a degree of freedom in the dispersion compensation is low.

SUMMARY OF THE INVENTION

According to one aspect of the present invention, a dispersion compensator includes at least one first optical waveguide, a first slab waveguide, an arrayed waveguide connected to the at least one first optical waveguide via the first slab waveguide. The arrayed waveguide includes a plurality of channel waveguides each of which has a different length. At least one second optical waveguide is connected to the arrayed waveguide via the second slab waveguide. A phase distribution provider is configured to provide a phase distribution to the arrayed waveguide.

According to another aspect of the present invention, a dispersion compensator includes at least one first optical waveguide, a first slab waveguide, an arrayed waveguide connected to the at least one first optical waveguide via the first slab waveguide. The arrayed waveguide includes a plurality of channel waveguides each of which has a different length. At least one second optical waveguide is connected to the arrayed waveguide via the second slab waveguide. A phase distribution provider is configured to provide a phase distribution to the arrayed waveguide. At least one dispersion compensation optical fiber is connected to the at least one first optical waveguide or the at least one second optical waveguide.

According to yet another aspect of the present invention, a method for manufacturing a dispersion compensator includes forming a circuit pattern on the core film. The circuit pattern includes at least one first optical waveguide, a first slab waveguide, an arrayed waveguide connected to the at least one first optical waveguide via the first slab waveguide, a second slab waveguide, at least one second optical waveguide connected to the arrayed waveguide via the second slab waveguide. An over-clad film is formed on the core pattern. A heater is formed on the over-clad film over the arrayed waveguide.

According to further aspect of the present invention, a dispersion compensator includes a substrate and a circuit pattern formed on the substrate. The circuit pattern includes at least one first optical waveguide, a first slab waveguide, an arrayed waveguide connected to the at least one first optical waveguide via the first slab waveguide, a second slab waveguide, and at least one second optical waveguide connected to the arrayed waveguide via the second slab waveguide. An over-clad film is formed on the substrate to cover the circuit pattern. A phase distribution provider which is configured to provide a phase distribution to the arrayed waveguide is provided on the over-clad film over the arrayed waveguide.

According to yet further aspect of the present invention, a method for compensating wavelength dispersion in a optical transmission path includes providing a dispersion compensator. The dispersion compensator includes at least one first optical waveguide, a first slab waveguide, an arrayed waveguide connected to the at least one first optical waveguide via the first slab waveguide, and a second slab waveguide, at least one second optical waveguide connected to the arrayed waveguide via the second slab waveguide. A phase distribution is provided to the arrayed waveguide.

BRIEF DESCRIPTION OF THE DRAWINGS

A more complete appreciation of the invention and many of the attendant advantages thereof will become readily obtained as the same becomes better understood with reference to the following detailed description when considered in conjunction with the accompanying drawings, wherein.

DESCRIPTION OF THE EMBODIMENTS

Figure 1:
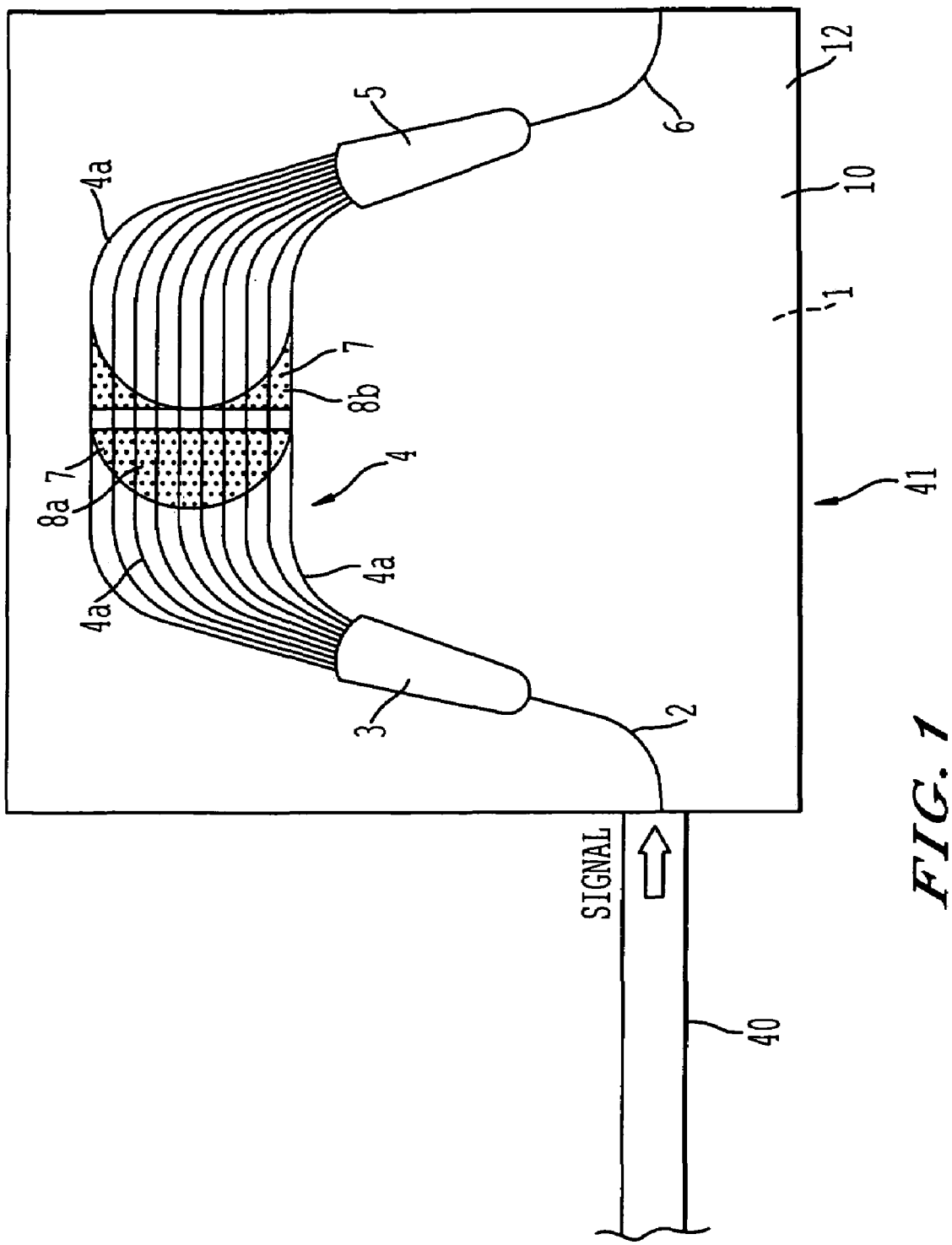
FIG. 1 is a structural view schematically showing a dispersion compensation system according to an embodiment of the present invention.

The embodiments will now be described with reference to the accompanying drawings, wherein like reference numerals designate corresponding or identical elements throughout the various drawings.

FIG. 1 schematically shows a structural view of a main section of a dispersion compensation system according to an embodiment of the present invention. The dispersion compensation system of the embodiment includes a dispersion compensation optical fiber 40 and a dispersion compensator 41. The dispersion compensation optical fiber 40 is connected to a light input side of the dispersion compensator 41. The dispersion compensation system according to the embodiment of the present invention compensates a wavelength dispersion of the optical transmission path.

The dispersion compensator 41 includes an optical circuit 12. The optical circuit 12 includes at least one (for example, one in the embodiment) optical input waveguide 2; a first slab waveguide 3 connected to an output side of the optical input waveguide 2; an arrayed waveguide 4, which is connected to an output side of the first slab waveguide 3 and includes a plurality of channel waveguides (4a) arranged side by side and having lengths different from each other by a predetermined length; a second slab waveguide 5 connected to an output side of the arrayed waveguide 4; and at least one (for example, one in the embodiment) optical output waveguide 6 connected to an output side of the second slab waveguide 5. Also, the arrayed waveguide 4 of the optical circuit 12 is provided with a phase distribution providing section 7 for providing a predetermined phase distribution.

Figure 2A:
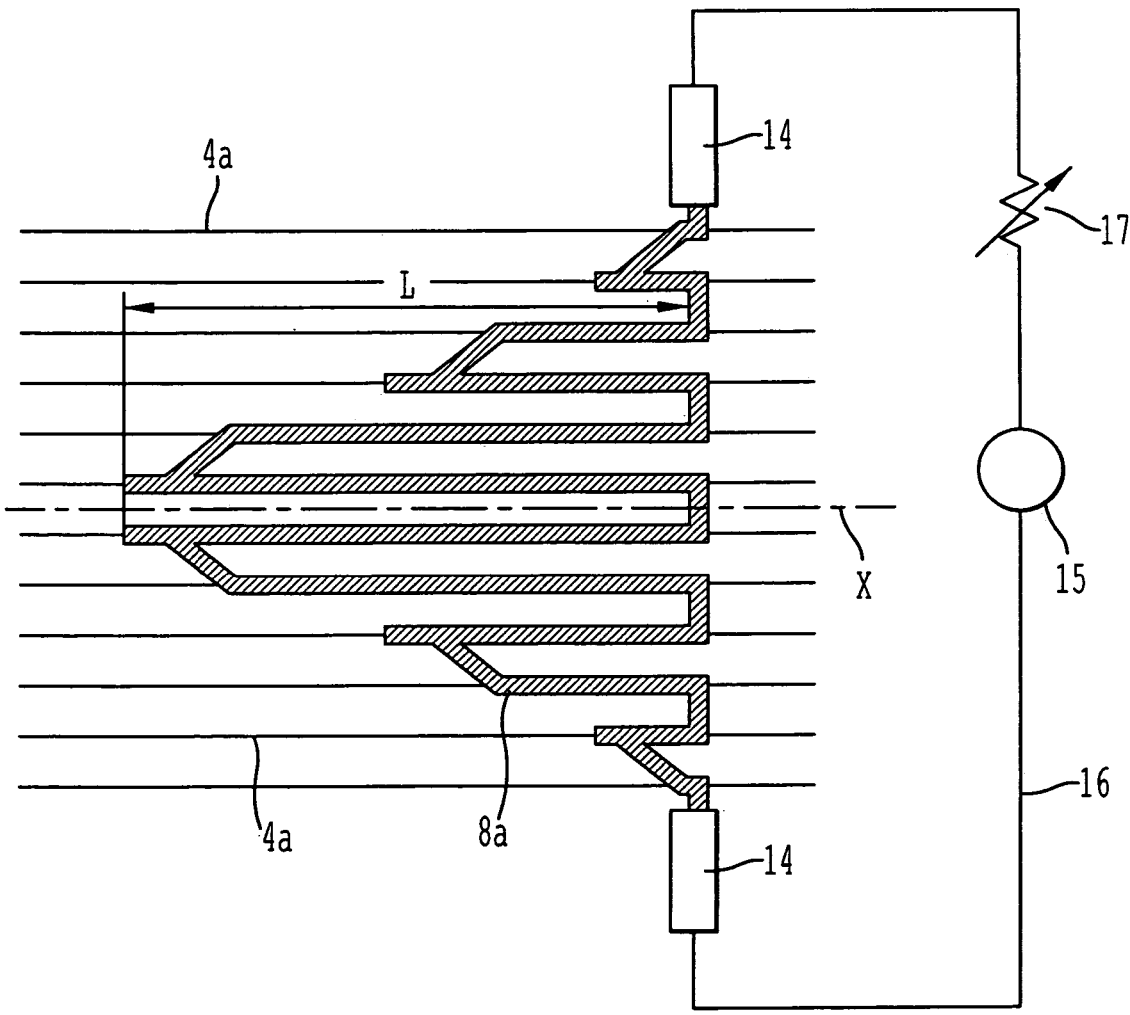
FIGS. 2(a) and 2(b) are explanatory views of a phase distribution providing section.
Figure 2B:
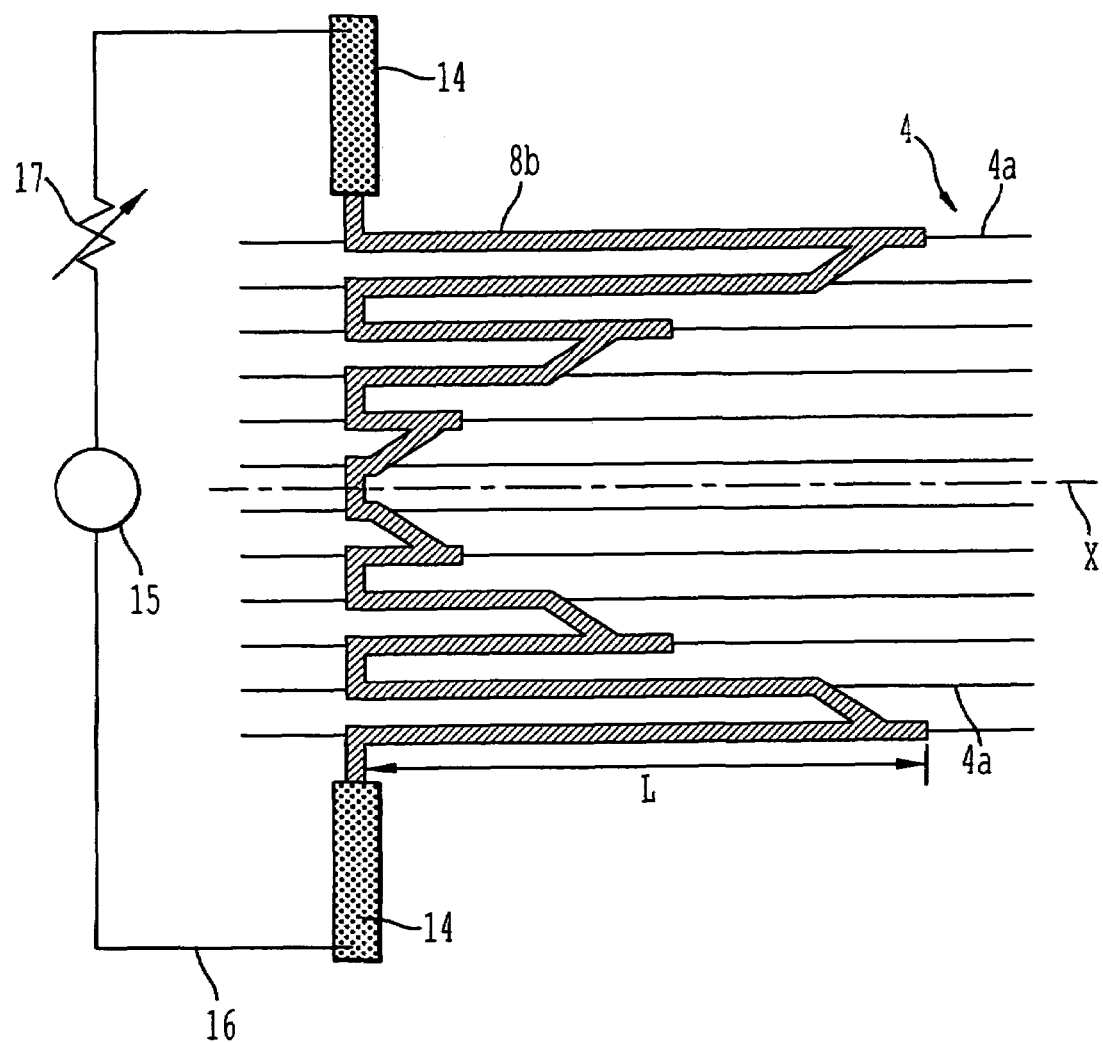

The predetermined phase distribution is an even function distribution which is substantially symmetrical with respect to a center line (X) (see FIGS. 2(a) and 2(b)) among the channel waveguides (4a). The center line (X) is a center (M−1)/2 of a channel waveguide number (k) provided that the number of the channel waveguides (4a) of the arrayed waveguide 4 is M (M is a positive integer) and that the channel waveguide (4a) number assigned in order of the arrangement of the channel waveguides (4a) is k (k=0 to M−1).

Figure 5:
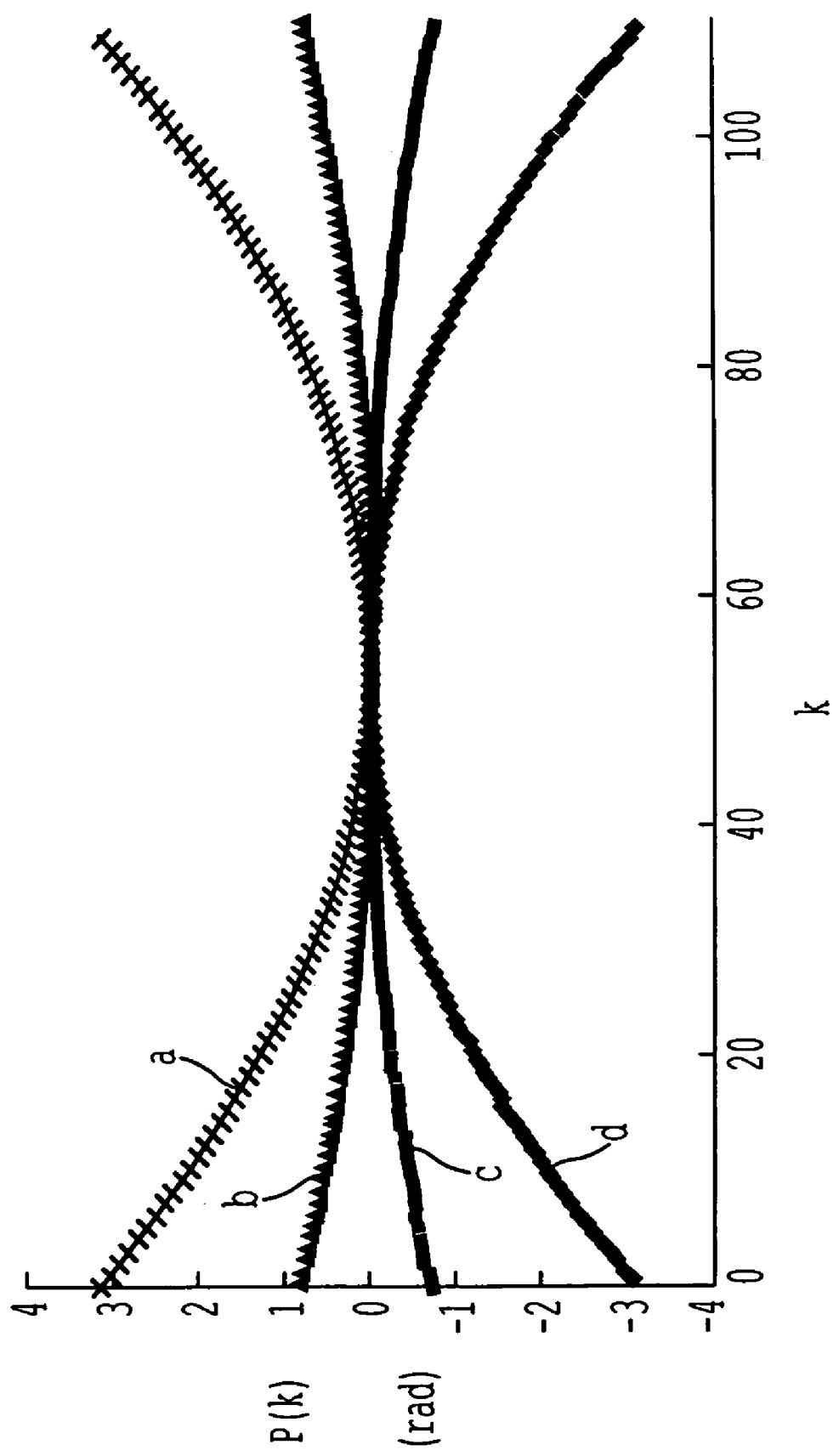
FIG. 5 is a graph showing a phase distribution of a dispersion compensator according to an embodiment of the present invention.

This even function distribution is a quadric distribution as shown in FIG. 5, for example, and can be the phase distribution P(k) expressed by formula 1 including the coefficient (A).

$$P(k)=A\{k-(M-1)/2\}^2/\{(M-1)/2\}^2 \qquad \text{[Formula 1]}$$

In FIG. 5, a characteristic line (a) indicates a case that the coefficient (A) in the formula 1 is +π(rad), and a characteristic line (b) indicates a case that the coefficient (A) in the formula 1 is +0.8(rad). Also, a characteristic line (c) indicates a case that the coefficient (A) in the formula 1 is −0.8(rad), and a characteristic line (d) indicates a case that the coefficient (A) in the formula 1 is −π(rad).

As shown in FIG. 1, the phase distribution providing section 7 includes first and second heaters (8a and 8b) as heating sections for heating at least a predetermined region of a forming region of the arrayed waveguide 4, and an electric power source (not shown in FIG. 1) which is connected to the heaters (8a and 8b).

FIGS. 2(a) and 2(b) schematically show an enlarged view of the first and second heaters (8a and 8b), respectively. The first and second heaters (8a and 8b) are provided to be substantially symmetrical with respect to the center line (X) among the plurality of channel waveguides (4a). The first heater (8a) is connected to the electric power source 15 via electrodes 14 and a lead wire 16. An electric power supply controller 17 is provided in the lead wire 16. In the present embodiment, the electric power supply controller 17 is, for example, a variable resistor. The electric power supply controller 17 is configured to control electric power supply to the first heater (8a) to adjust the phase distribution provided to the arrayed waveguide.

The second heater (8b) is also connected to the electric power source 15 via electrodes 14 and a lead wire 16. An electric power supply controller 17 is provided in the lead wire 16.

In the phase distribution providing section 7, the refractive index of each channel waveguide (4a) is adjusted by being heated by the heaters (8a, 8b), so that the phase distribution substantially becomes the even function distribution. The phase distribution providing section 7 functions as a refractive index adjuster.

In the phase distribution providing section 7, the phase distribution is variable. By changing an electric power supply amount to the heaters (8a, 8b) from the electric power source 15, the heating amount supplied to the channel waveguide (4a) by the heaters (8a, 8b) changes. Thus, the refractive index of the corresponding channel waveguide (4a) changes corresponding to the supplied heating amount.

Although the shapes of the heaters (8a, 8b) are not limited to the specific one, in the embodiment of the invention, as shown in FIG. 1, the first and second heaters (8a and 8b) are arranged with an interval therebetween. The first heater (8a) and the electric power source for the first heater (8a) function as a phase shifter for a positive dispersion compensation, and the second heater (8b) and the electric power source for the heater (8b) function as a phase shifter for a negative dispersion compensation.

In order to determine the structure of the dispersion compensation device, the inventors of the present invention has studied as follows.

Firstly, if dispersion compensation of the optical transmission path is carried out only by the dispersion compensator without using the dispersion compensation optical fiber, the accurate controllability of the dispersion compensation amount might be a problem and the periodic characteristic in the free spectral range of the dispersion compensator might be a problem.

Therefore, the inventors considered that more than about 50% of dispersion compensation is carried out by the dispersion compensation optical fiber, and the remaining dispersion compensation is conducted by the dispersion compensator instead of conducting the entire dispersion compensation by the dispersion compensator. Preferably, a ratio of a dispersion compensation amount compensated by the dispersion compensator to a dispersion compensation amount compensated by the at least one dispersion compensation optical fiber is from about 0.1 to about 0.35. According to such a structure, the dispersion compensation amount compensated by the dispersion compensator becomes a small value of, for example, at most ±100 psec/nm.

Accordingly, in the embodiment of the present invention, dispersion compensation system includes the dispersion compensator 41 and the dispersion compensation optical fiber 40 which is connected to the dispersion compensator 41.

Incidentally, since the phase characteristic of the transfer function of the optical circuit 12 of the present structure is a linear phase, the dispersion value obtained by the second derivative with respect to the angular frequency is 0 psec/nm. Thus, since the dispersion is not generated in the optical circuit 12 as it is, some contrivance is necessary.

Therefore, the inventors considered that a new predetermined phase distribution for generating the wavelength dispersion is provided to the arrayed waveguide 4 of the optical circuit 12.

When the number of the provided channel waveguides (4a) of the arrayed waveguide 4 is M (M is positive integer) and the channel waveguide (4a) number assigned in order of the arrangement of the channel waveguides (4a) is k (k=0 to M−1), the transfer function of the optical circuit 12 in consideration of the phase distribution P(k) formed in the arrayed waveguide 4 can be found by the formula 5.

$$H(\lambda) = \sum_{k=0}^{M-1} A_k \exp(-j \cdot 2\pi/\lambda \cdot n_{\mathit{eff}} k \Delta L) \exp\{-jP(k)\}$$ [Formula 5]

In the formula 5, $\lambda$ is a wavelength, H(k) is a transfer function of the light having the wavelength ($\lambda$), and $A_k$ is an optical amplitude of the channel waveguide (4a). Also, $n_{\mathit{eff}}$ is an equivalent refractive index of the channel waveguide (4a), $\Delta L$ is an optical path length difference of the adjacent channel waveguides (4a), and $j=(-1)^{1/2}$.

The inventors considered that the adequate dispersion can be generated by setting the phase distribution P(k) at the adequate predetermined phase distribution, and studied as follows.

Figure 3A:
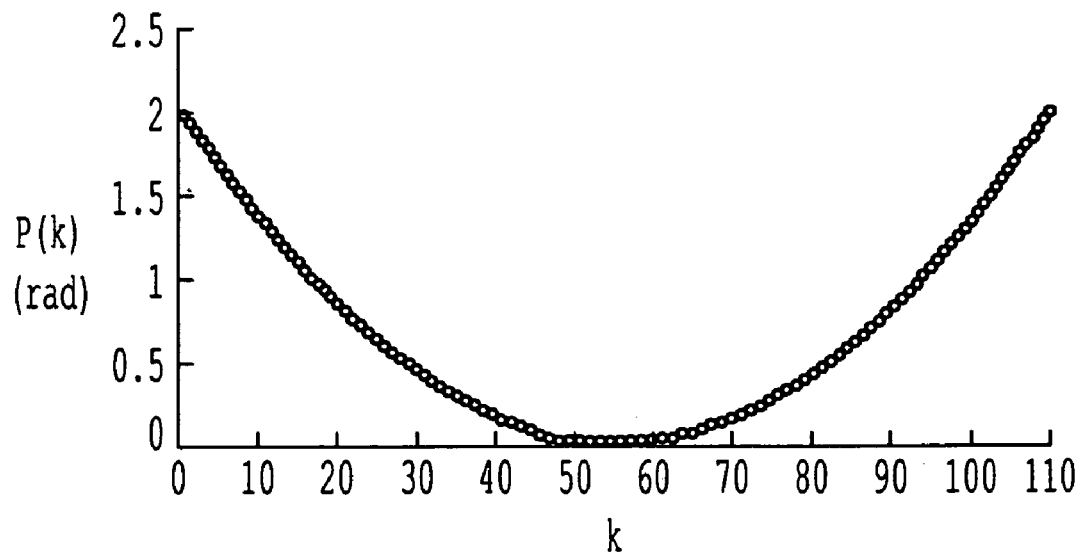
FIG. 3(a) is a graph showing an example of an even function phase distribution.
Figure 3B:
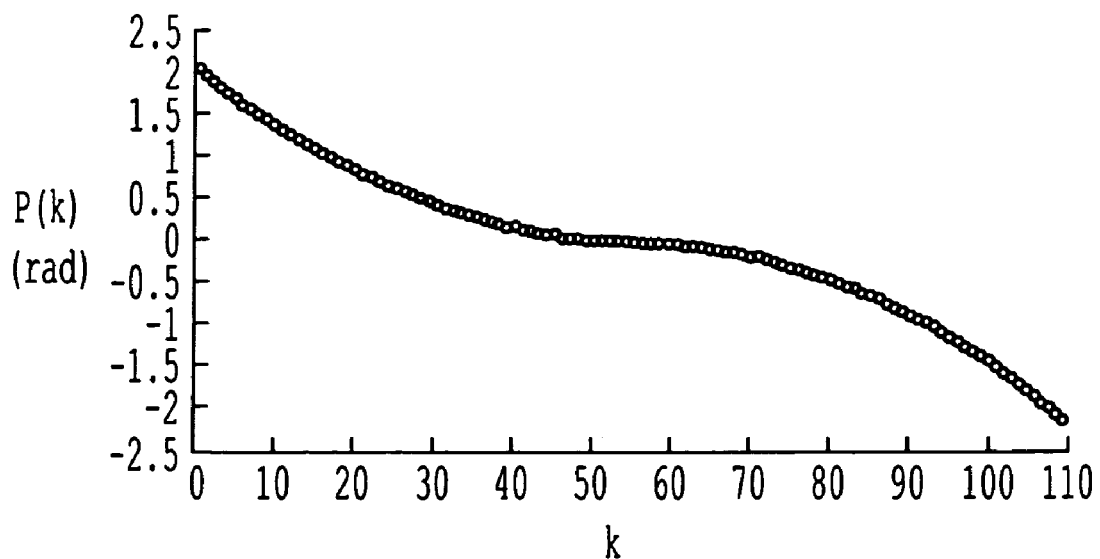
FIG. 3(b) is a graph showing an example of an odd function phase distribution.

Firstly, it is determined whether the phase distribution P(k) should be the even function distribution substantially linearly symmetrical with respect to the center of the channel waveguide number (k) as shown in FIG. 3(a) or the phase distribution P(k) should be the odd function distribution which is not linearly symmetrical with respect to the center of the channel waveguide number (k) as shown in FIG. 3(b). Incidentally, the even function distribution shown in FIG. 3(a) is the quadric function distribution.

Figure 4A:
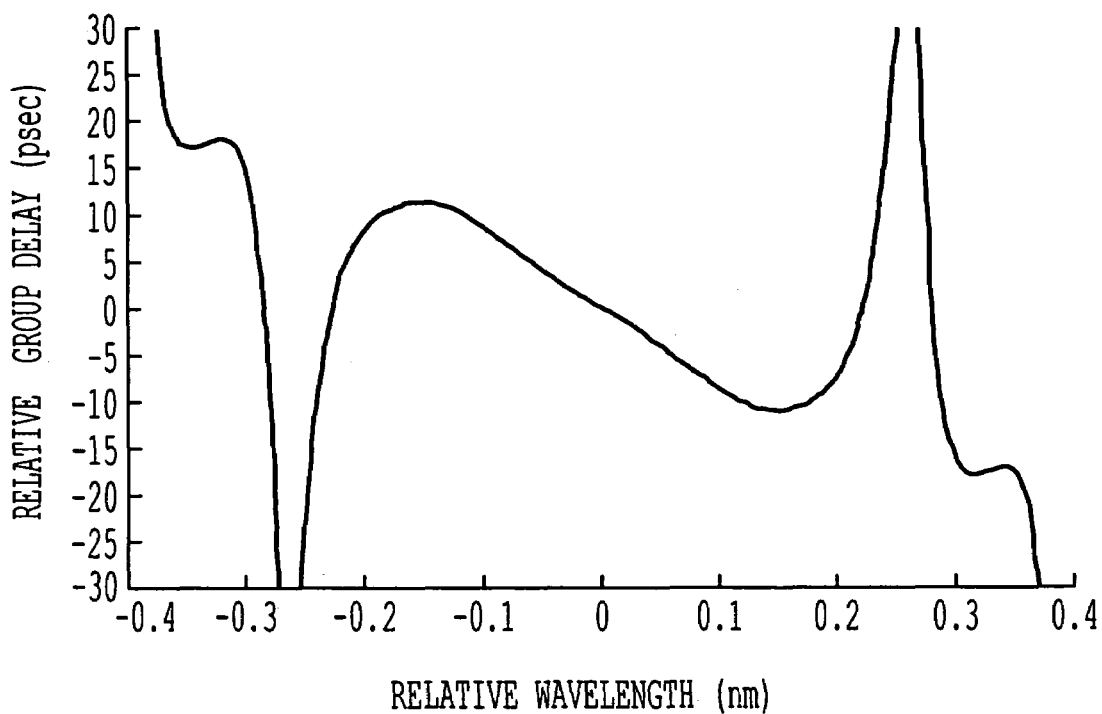
FIG. 4(a) is a graph showing a state of generated waveguide dispersions when a phase distribution provided to an arrayed waveguide is the even function phase distribution.
Figure 4B:
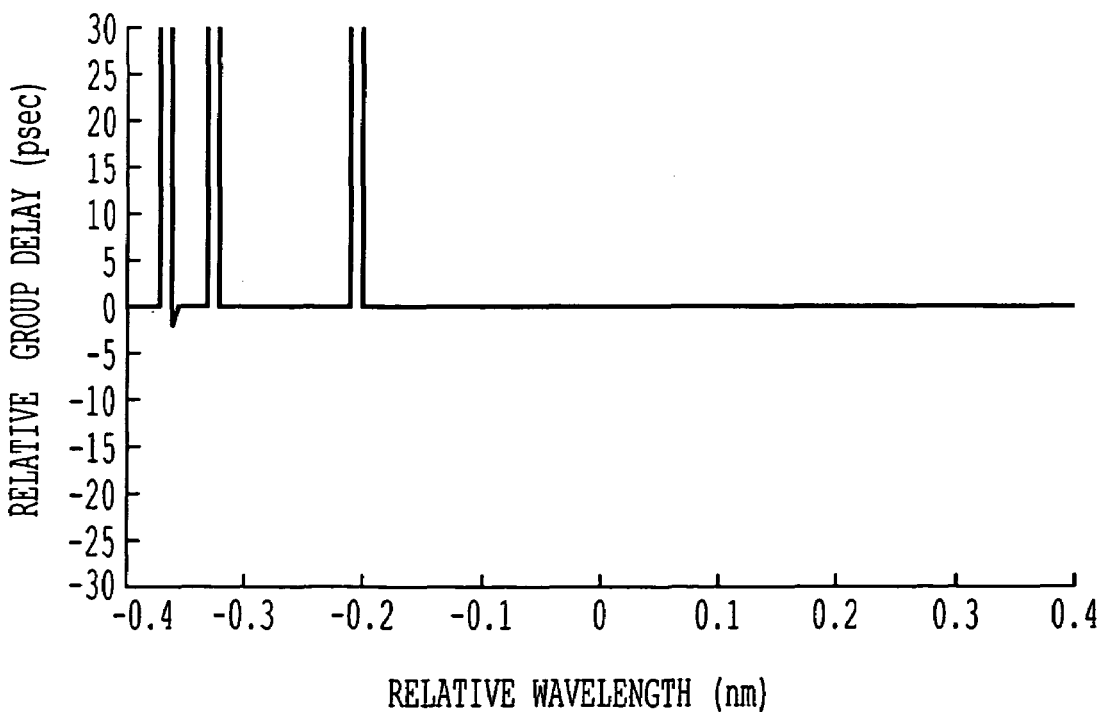
FIG. 4(b) is a graph showing a state of generated waveguide dispersions when a phase distribution provided to an arrayed waveguide is the odd function phase distribution.

Then, as a result of calculating the wavelength dispersions respectively regarding the even function distribution and the odd function distribution by using the phase distribution P(k) and the formula 5, the results shown in FIGS. 4(a) and 4(b) are obtained. FIG. 4(a) shows a relative group delay (wavelength dispersion) in case the phase distribution P(k) is the even function distribution, and FIG. 4(b) shows a relative group delay in case the phase distribution P(k) is the odd function distribution.

As understood from FIGS. 4(a) and 4(b), the dispersion is not generated in the odd function phase distribution almost at all, but the dispersion is generated in the even function phase distribution.

Therefore, it has been found that the predetermined phase distribution is the even function distribution in order to generate the dispersion efficiently. Therefore, in the present embodiment, it is determined that the predetermined phase distribution provided to the arrayed waveguide 4 by the phase distribution providing section is the even function distribution. For example, the quadric function distribution P(k) expressed by the formula 1 is provided.

Also, in the present embodiment, the phase distribution providing section 7 for providing the predetermined phase distribution is formed by providing the heaters 8 for heating the predetermined region of the arrayed waveguide 4 forming region, to thereby provide the simple structure in which the refractive index of the channel waveguide (4a) can be adjusted by heating the heaters 8. Also, by changing the amount of electric power supply to the heater 8, the adjusted amount of the refractive index of the channel waveguide (4a) changes. Thus, the predetermined phase distribution is also variable.

In this case, the phase shift amount $\Phi_{shift}$ is expressed by the formula 6.

$$\Phi_{shift} = \{(2\pi/\lambda)(dn/dT)\Delta T\}L$$ [Formula 6]

In the formula 6, $\lambda$ is the wavelength, n is the refractive index of the channel waveguide (4a), and T is temperature. Also, $\Delta T$ is a temperature change of the heater. The heater extends along each of said plurality of channel waveguides (4a). The length (L) is the maximum length of the heater extending along each of the plurality of channel waveguides (4a) (see FIGS. 2(a) and 2(b)). The dn/dT is a temperature tendency of the refractive index of the channel waveguide (4a). For example, the dn/dT is about $8 \times 10^{-6}$ in case the channel waveguide (4a) is a silica-based optical waveguide.

Therefore, in case that L=4000 µm, for example, in order to change the phase by $\pi$ at the wavelength of 1.55 µm, the temperature change of the heater 8 is about 24° C.

Thus, in the present embodiment, the maximum value (the length of the heater (8a) formed in the channel waveguide 4a at the center of the arrangement in this case) of the length of the heater (8a) is set at 4000 µm, and the temperature change amount of the heater (8a) is set at about 24° C. at its maximum, so that the phase distribution can be changed from 0 to −$\pi$(rad).

Also, the maximum value (the length of the heater (8b) formed in the channel waveguide 4a at both ends of the arrangement in this case) of the length of the heater (8b) is set at 4000 µm, and the temperature change amount of the heater (8b) is set at about 24° C. at its maximum, so that the phase distribution can be changed from 0 to +$\pi$(rad).

According to the embodiment of the present invention, the maximum value of the phase distribution can be changed from −$\pi$(rad) to +$\pi$(rad).

Figure 6:
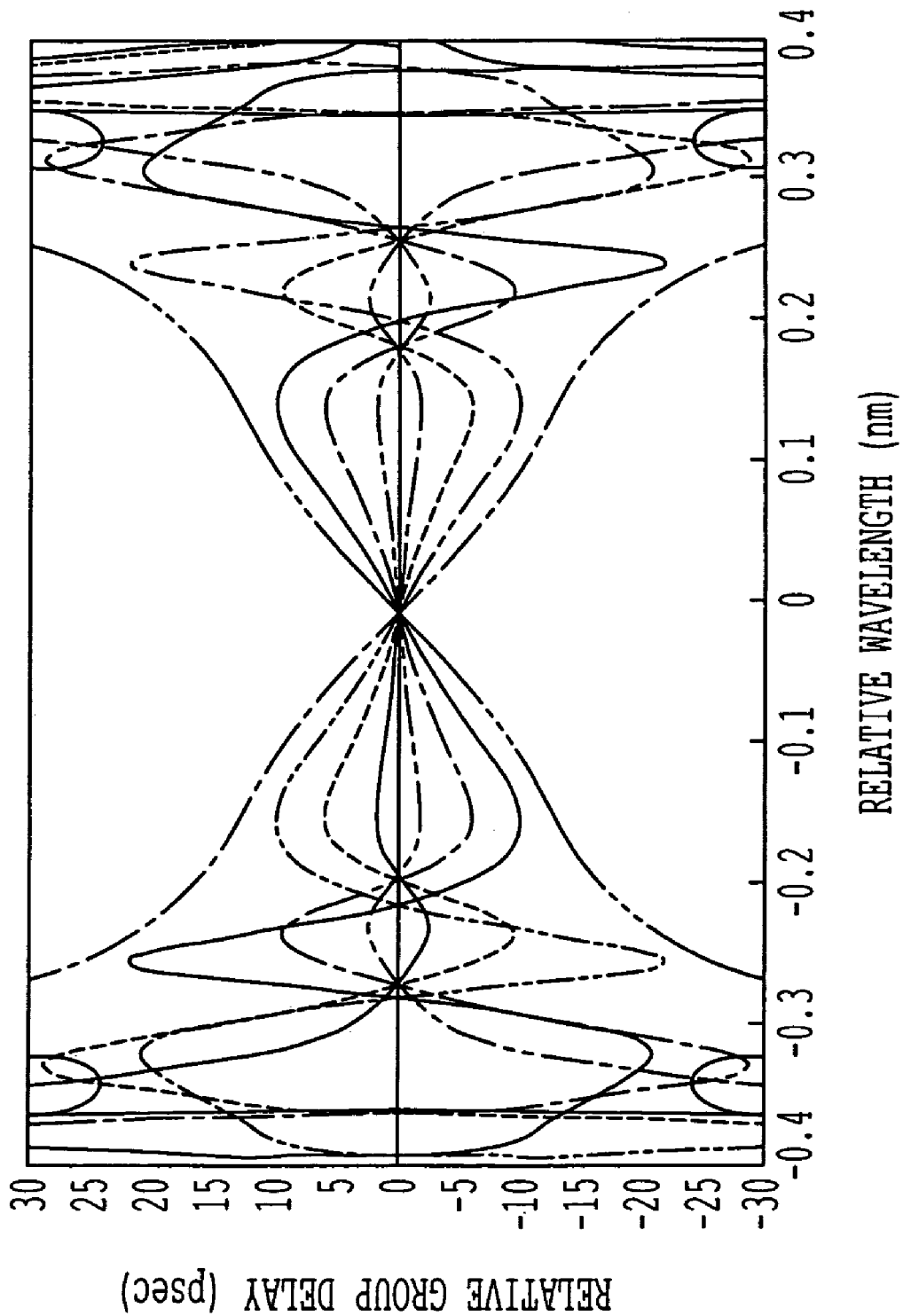
FIG. 6 is a graph showing calculated values of the wavelength dispersion generated by the dispersion compensator according to the embodiment of the present invention.

FIG. 6 shows the calculated values of the dispersion characteristic of the dispersion compensator 41 according to the embodiment of the present invention. As shown in FIG. 6, in the calculation, it is found that the wavelength dispersion can be changed form +105 psec/nm to −105 psec/nm.

Since the dispersion compensation system according to the embodiment of the present invention is formed by connecting the aforementioned dispersion compensator 41 and the dispersion compensation optical fiber 40, the majority of the wavelength dispersion of the optical transmission path is conducted by the dispersion compensation optical fiber 40 and the remaining wavelength dispersion is slightly adjusted by the dispersion compensator 41, so that the wavelength dispersion of the optical transmission path can be accurately compensated.

Also, according to the embodiment of the present invention, since the dispersion compensator 41 includes the optical circuit 12 and the phase distribution providing section 7 for providing the predetermined phase distribution for generating the wavelength dispersion to the arrayed waveguide 4 of the optical circuit 12, the wavelength dispersion can be generated by the simple structure.

Further, according to the embodiment of the present invention, based on the studies by the inventors, the predetermined phase distribution is the even function distribution which is substantially linearly symmetrical with respect to the center of the channel waveguide number. Electric power is supplied to the heaters (8a, 8b) to adjust the refractive index of each channel waveguide (4a) such that the phase distribution is the even function distribution. Accordingly, the wavelength dispersion can be generated easily and adequately.

Still further, according to the embodiment of the present invention, by changing the electric power supply to the heaters (8a, 8b), the phase distribution changes. Thus, wavelength dispersion also changes. Therefore, the wavelength dispersion can be changed in correspondence to the optical transmission path, so that the cost for applying the wavelength dispersion technology can be reduced, resulting in decreasing the cost for the optical communication system.

As shown in FIG. 1, the dispersion compensation device is a dispersion compensation system formed by connecting the dispersion compensation optical fiber 40 and the dispersion compensator 41, and the dispersion compensation optical fiber 40 is formed of a dispersion compensation optical fiber which can compensate a dispersion of 1000 psec/nm. Also, the dispersion compensator 41 is manufactured as follows.

Figure 18:
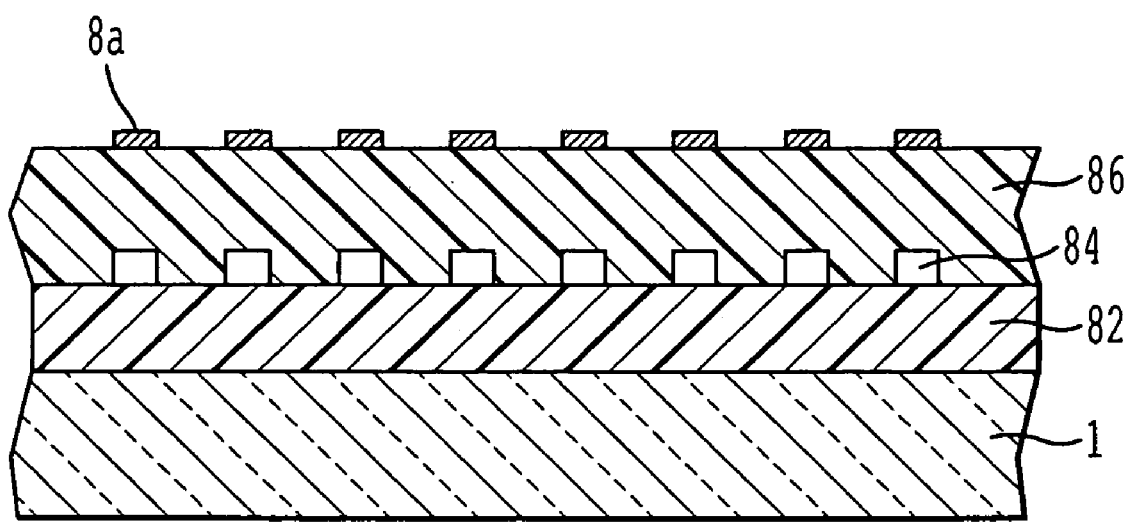
FIG. 18 is a cross-sectional view of a dispersion compensators according to an embodiment of the present invention.

Referring to FIG. 18, in manufacturing the dispersion compensator 41, firstly, an under-clad film 82 and a core film are formed on the silicon substrate 1 by using, for example, a flame hydrolysis deposition method. Through a photomask in which the circuit pattern of the dispersion compensator having the structure shown in FIG. 1 is drawn, the circuit pattern of the photomask is transferred to the core film by using, for example, the photolithography, the reactive ion etching or the like. Consequently, core pattern 84 is formed.

Thereafter, the over-clad film 86 is formed by using, for example, the flame hydrolysis deposition method. Then, in order to form the heaters (8a and 8b) on a front surface of the over-clad film 86 in the predetermined region of the arrayed waveguide forming region, using a photomask which is formed such that the phase distribution of the arrayed waveguide 4 becomes the predetermined phase distribution, the heaters (8a, 8b) of the Cr film and the electrodes 14 are formed on the front surface of the over-clad film 86 of the arrayed waveguide 4 by using the photolithography and the sputtering method. Then, the electric power source is connected to the dispersion compensator 41.

Also, in this embodiment, the design values of the dispersion compensator 41 are set as in the following table 1.

TABLE 1

| Name of the parameter | Design value |
| --- | --- |
| linear dispersion | 75 GHz/20 μm |
| free spectral range | 9.4 nm |
| focal distance of the first and second slab waveguides | 4489.48 μm |
| optical path length difference ΔL of the adjacent channel waveguides | 173.157 μm |
| diffraction order | 162 |
| number of the channel waveguides | 110 |
| arrangement pitch of the channel waveguides | 15 μm |
| maximum length of forming the heater | 4000 μm |
| shape of the predetermined phase distribution | quadric function |

Then, the phase distribution given to the arrayed waveguide 4 by the phase distribution providing section 7 is set as a phase distribution P(k) having the quadric function distribution as expressed by the formula 1, and as in the distribution shown by the characteristic lines (a) to (d) in FIG. 5, by changing the coefficient (A) in the formula 1, the phase distribution is set to be variable.

Figure 7:
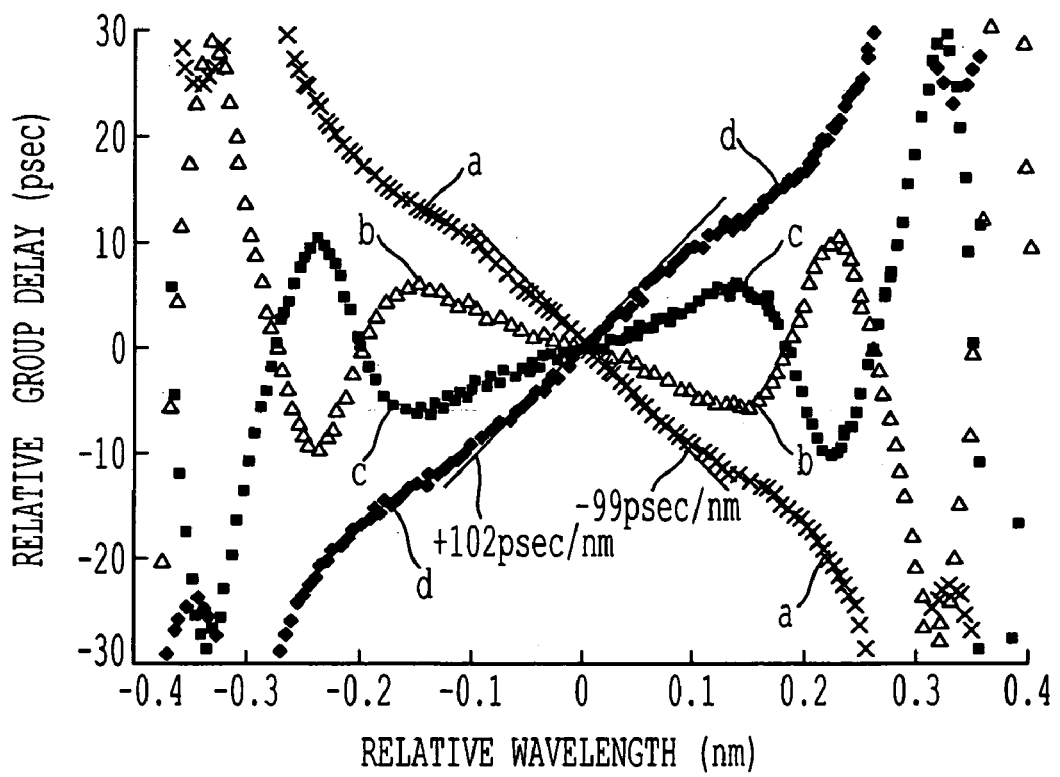
FIG. 7 is a graph showing waveguide dispersion generated by the dispersion compensator according to the embodiment of the present invention.
Figure 8:
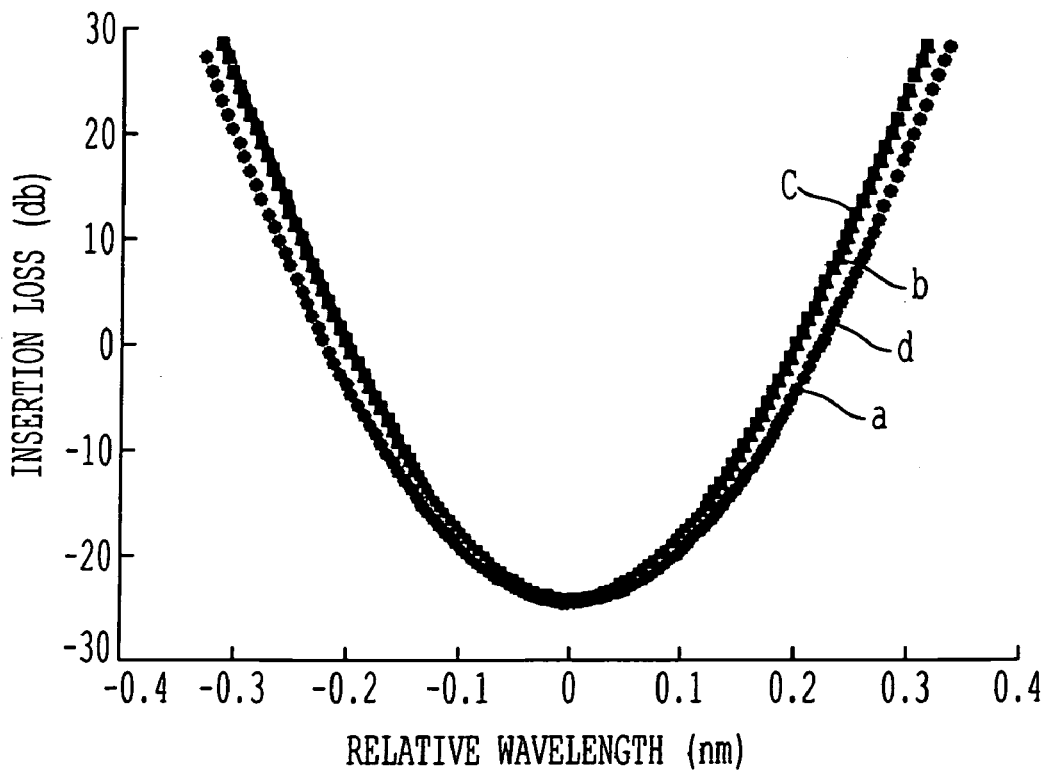
FIG. 8 is a graph showing an example of a light transmittance characteristic of the dispersion compensator according to the embodiment of the present invention.

The characteristic lines (a) to (d) in FIG. 7 show the dispersion characteristics of the dispersion compensator 41 in the embodiment of the present invention, and the characteristic lines (a) to (d) in FIG. 8 show the optical transmittance characteristics of the dispersion compensator 41 according to the present embodiment of the present invention. In FIG. 7 and FIG. 8, a characteristic line (a) indicates a case that the coefficient (A) in the formula 1 is +π(rad), and the characteristic line (b) indicates a case that the coefficient (A) in the formula 1 is +0.8(rad). Also, the characteristic line (c) indicates a case that the coefficient (A) in the formula 1 is −0.8(rad), and the characteristic line (d) indicates a case that the coefficient (A) in the formula 1 is −π(rad).

In view of the characteristic lines (a) to (d) in FIG. 7, it is found that the wavelength dispersion can be change from about +102 psec/nm to −99 psec/nm in the dispersion compensator 41 according to the present embodiment. In other words, in the dispersion compensation device, the wavelength dispersion of 1000 psec/nm can be compensated by the dispersion compensation optical fiber 40, and the remaining dispersion which has not been able to be compensated can be compensated in the range of about +102 psec/nm to −99 psec/nm by the dispersion compensator 41.

Next, a dispersion compensation device according to another embodiment of the present invention will be explained. In the dispersion compensation device, the phase distribution given to the arrayed waveguide 4 by the phase distribution providing section 7 is set as the phase distribution P(k) including the sine function distribution expressed by a formula 2 including the coefficient (A).

$$P(k) = A\{1 + \sin(-k\pi/M)\} \quad \text{[Formula 2]}$$

The design values of the dispersion compensator 41 according to the present embodiment are set as shown in the following table 2. The heaters 8 (8a, 8b) are the heaters made of TiNi film. The electrodes are Au electrodes.

TABLE 2

| Name of the parameter | Design value |
| --- | --- |
| linear dispersion | 50 GHz/20 μm |
| free spectral range | 1.6 nm |
| focal distance of the first and second slab waveguides | 1148.36 μm |
| optical path length difference ΔL of the adjacent channel waveguides | 1015.4 μm |
| diffraction order | 950 |
| number of the channel waveguides | 30 |
| arrangement pitch of the channel waveguides | 15 μm |
| maximum length of forming the heater | 4000 μm |
| shape of the predetermined phase distribution | sine function |

Figure 9:
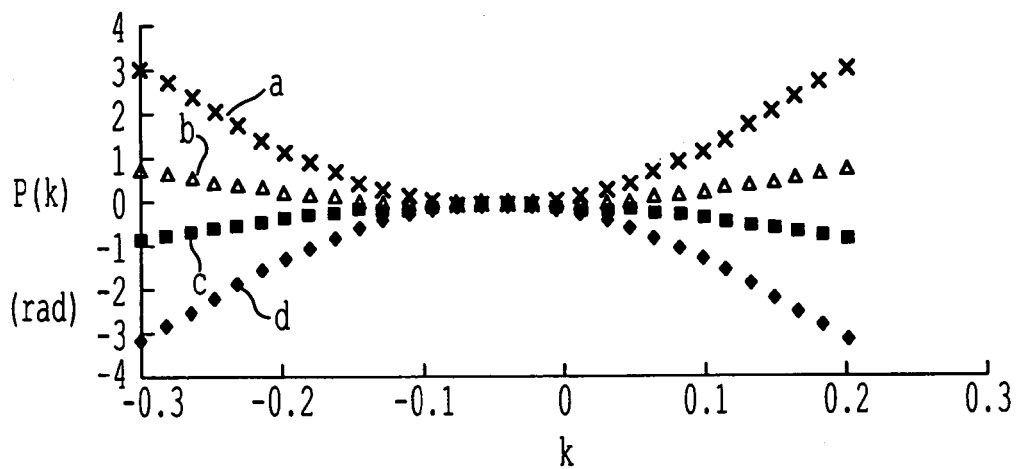
FIG. 9 is a graph showing a phase distribution of a dispersion compensator according to an embodiment of the present invention.

In the present embodiment, as in the distributions shown by characteristic lines (a) to FIG. 9, for example, the coefficient (A) in the formula 2 is changed, so that the phase distribution can be changed.

Incidentally, in FIG. 9, the characteristic line (a) indicates a case that the coefficient (A) in the formula 2 is +π(rad), and the characteristic line (b) indicates a case that the coefficient (A) in the formula 2 is +0.8(rad). Also, the characteristic line (c) indicates a case that the coefficient (A) in the formula 2 is −0.8(rad), and the characteristic line (d) indicates a case that the coefficient (A) in the formula 2 is −π(rad).

Figure 10:
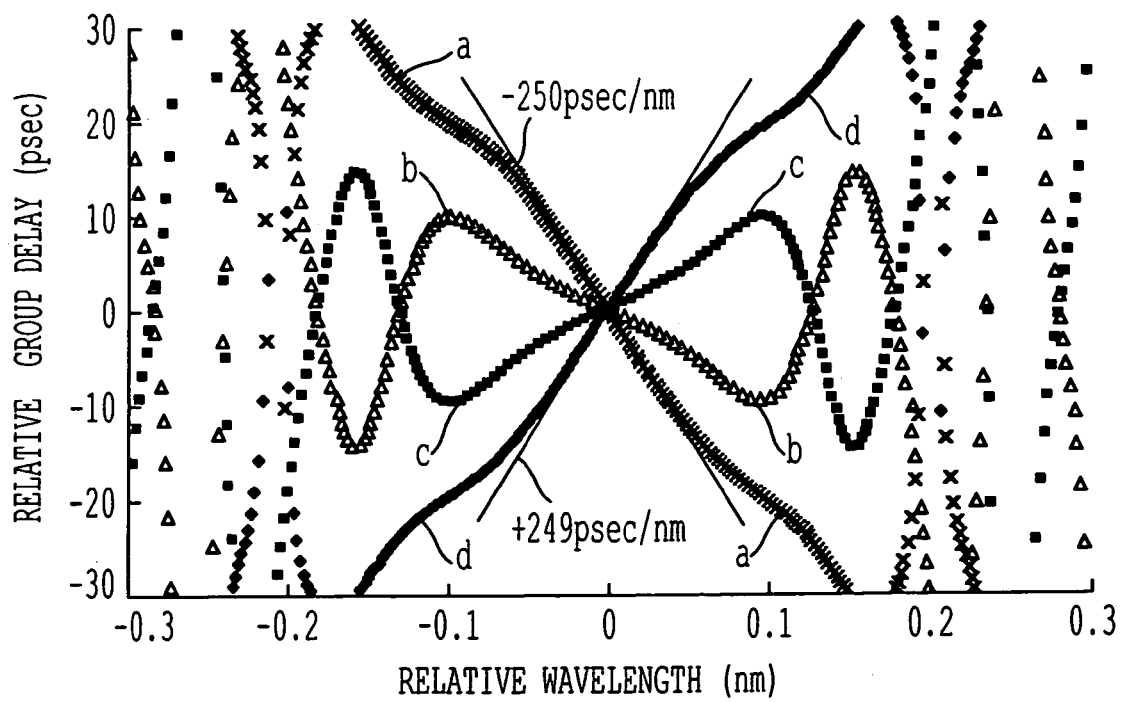
FIG. 10 is a graph showing waveguide dispersion generated by the dispersion compensator according to the embodiment of the present invention.

Also, the characteristic lines (a) to (d) in FIG. 10 show the dispersion characteristics of the dispersion compensator 41 according to in the present embodiment. Also in FIG. 10, the characteristic line (a) indicates a case that the coefficient (A) in the formula 2 is +π(rad); the characteristic line (b) indicates a case that the coefficient (A) in the formula 2 is +0.8(rad); the characteristic line (c) indicates a case that the coefficient (A) in the formula 2 is −0.8(rad); and the characteristic line. (d) indicates a case that the coefficient (A) in the formula 2 is −π(rad).

In view of the characteristic lines (a) to (d) in FIG. 10, it is found that the wavelength dispersion can be changed from about +249 psec/nm to −250 psec/nm in the dispersion compensator 41 applied to the second embodiment. In other words, in the dispersion compensation device according to the present embodiment, the wavelength dispersion of 1000 psec/nm can be compensated by the dispersion compensation optical fiber 40, and the remaining dispersion which has not been able to be compensated can be compensated in the range of about +249 psec/nm to −250 psec/nm by the dispersion compensator 41.

Next, a dispersion compensation device according to another embodiment of the present invention will be explained. In the dispersion compensation device, the phase distribution given to the arrayed waveguide 4 by the phase distribution providing section 7 is set as the phase distribution P(k) including the exponential function distribution expressed by the formula 3 including the coefficient (A).

$$P(k)=A(\exp[-\{k-(M-1)/2\}/4]+\exp[\{k-(M-1)/2\}/4])/[\exp\{(M-1)/8\}+\exp\{-(M-1)/8\}]$$ [Formula 3]

The design values of the dispersion compensator 41 are set as shown in the following table 3. The heaters 8 (8a, 8b) are the heaters made of TaN film. The electrodes are Au electrodes.

TABLE 3

| Name of the parameter | Design value |
| --- | --- |
| linear dispersion | 50 GHz/20 μm |
| free spectral range | 1.6 nm |
| focal distance of the first and second slab waveguides | 1148.36 μm |
| optical path length difference ΔL of the adjacent channel waveguides | 1015.4 μm |
| diffraction order | 950 |
| number of the channel waveguides | 30 |
| arrangement pitch of the channel waveguides | 15 μm |
| maximum length of forming the heater | 4000 μm |
| shape of the predetermined phase distribution | Exponential function |

Figure 11:
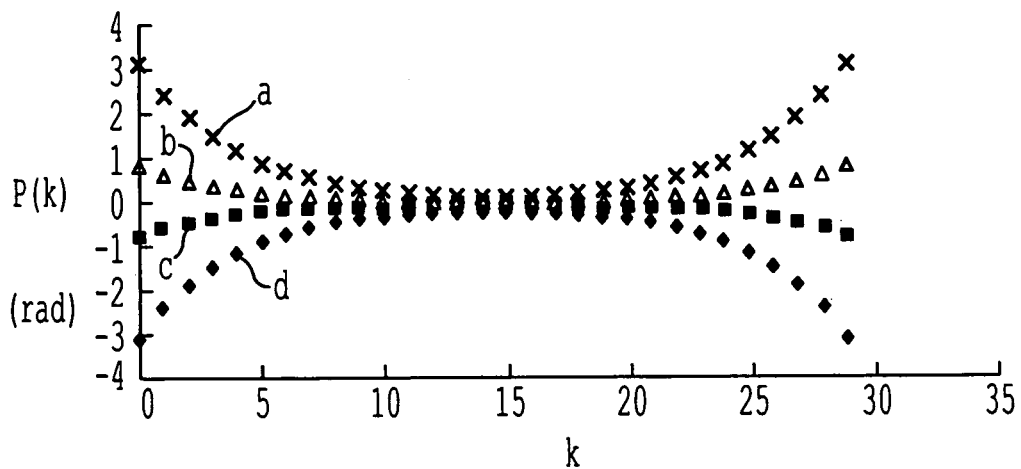
FIG. 11 is a graph showing a phase distribution of a dispersion compensator according to an embodiment of the present invention.

In the present embodiment, by changing the coefficient (A) of the formula 3 as in the distributions shown by the characteristic lines (a) to (d) in FIG. 11, for example, the predetermined phase distribution can be changed.

Incidentally, in FIG. 11, the characteristic line (a) indicates a case that the coefficient (A) in the formula 3 is +π(rad); the characteristic line (b) indicates a case that the coefficient (A) in the formula 3 is +0.8(rad); the characteristic line (c) indicates a case that the coefficient (A) in the formula 3 is −0.8(rad); and the characteristic line (d) indicates a case that the coefficient (A) in the formula 3 is −π(rad).

Figure 12:
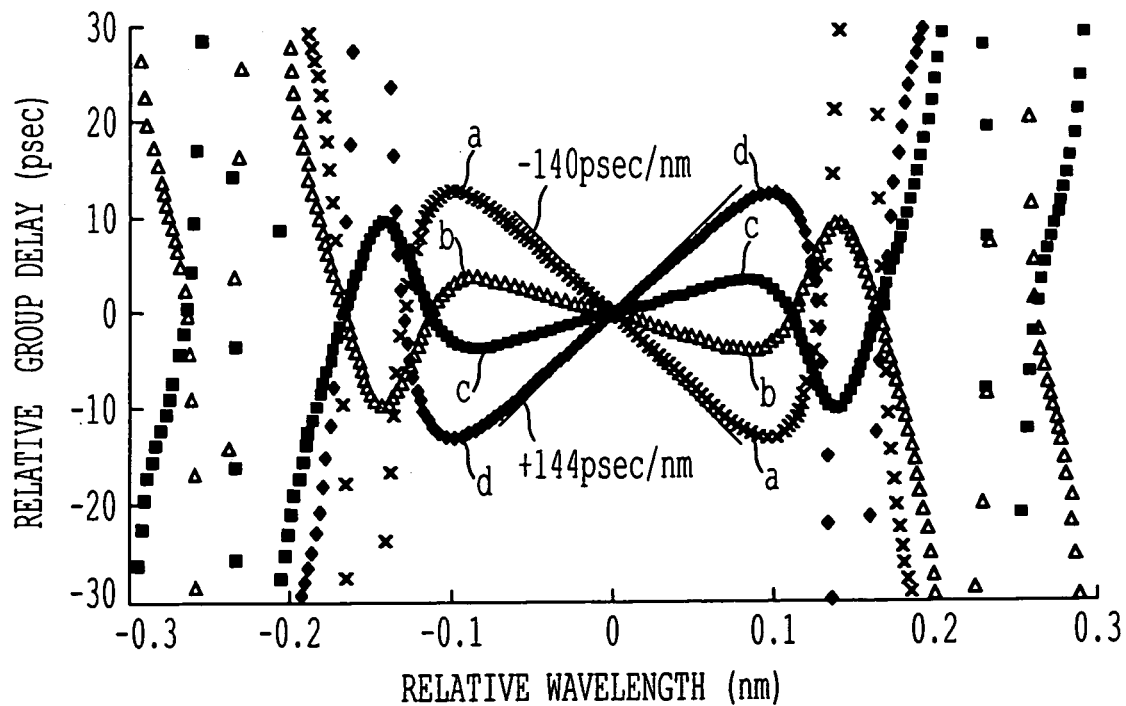
FIG. 12 is a graph showing waveguide dispersion generated by the dispersion compensator according to the embodiment of the present invention.

Further, the characteristic lines (a) to (d) in FIG. 12 shows the dispersion characteristics of the dispersion compensator according to the present embodiment. In FIG. 12, also, the characteristic line (a) indicates a case that the coefficient (A) in the formula 3 is +π(rad); the characteristic line (b) indicates a case that the coefficient (A) in the formula 3 is +0.8(rad); the characteristic line (c) indicates a case that the coefficient (A) in the formula 3 is −0.8(rad); and the characteristic line (d) indicates a case that the coefficient (A) in the formula 3 is −π(rad).

In view of the characteristic lines (a) to (d) in FIG. 12, it is found that the wavelength dispersion can be changed from about +144 psec/nin to −140 psec/nm in the dispersion compensator 41 according to the present embodiment. In other words, in the dispersion compensation device according to the present embodiment, the wavelength dispersion of 1000 psec/nm can be compensated by the dispersion compensation optical fiber 40, and the remaining dispersion which has not been able to be compensated can be compensated in the range of about +144 psec/nm to −140 psec/nm by the dispersion compensator 41.

Next, a dispersion compensation device according to another embodiment of the present invention will be explained. In the dispersion compensation device, the phase distribution given to the arrayed waveguide 4 by the phase distribution providing section 7 is set as the phase distribution P(k) including the linear function distribution expressed by the formula 4 including the coefficient (A).

$$P(k)=A|[-k/\{(M-1)/2\}]+1|$$ [Formula 4]

The design values of the dispersion compensator 41 are set as shown in the following table 4. The heaters 8 (8a, 8b) are formed of the heaters of TiNi film. The electrodes are Au electrodes.

TABLE 4

| Name of the parameter | Design value |
| --- | --- |
| linear dispersion | 50 GHz/20 μm |
| free spectral range | 1.6 nm |
| focal distance of the first and second slab waveguides | 1148.36 μm |
| optical path length difference ΔL of the adjacent channel waveguides | 1015.4 μm |
| diffraction order | 950 |
| number of the channel waveguides | 30 |
| arrangement pitch of the channel waveguides | 15 μm |
| maximum length of forming the heater | 4000 μm |
| shape of the predetermined phase distribution | linear function |

Figure 13:
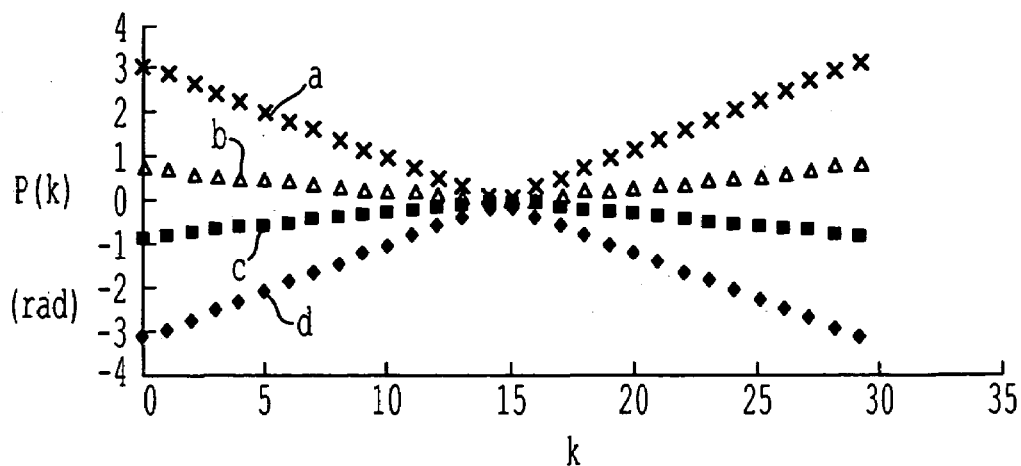
FIG. 13 is a graph showing a phase distribution of a dispersion compensator according to an embodiment of the present invention.

In the present embodiment, by changing the coefficient (A) of the formula 4 as in the distributions shown by the characteristic lines (a) to (d) in FIG. 13, for example, the predetermined phase distribution can be changed.

Incidentally, in FIG. 13, the characteristic line (a) indicates a case that the coefficient (A) in the formula 4 is +π(rad); the characteristic line (b) indicates a case that the coefficient (A) in the formula 4 is +0.8(rad); the characteristic line (c) indicates a case that the coefficient (A) in the formula 4 is −0.8(rad); and the characteristic line (d) indicates a case that the coefficient (A) in the formula 4 is −π(rad).

Figure 14:
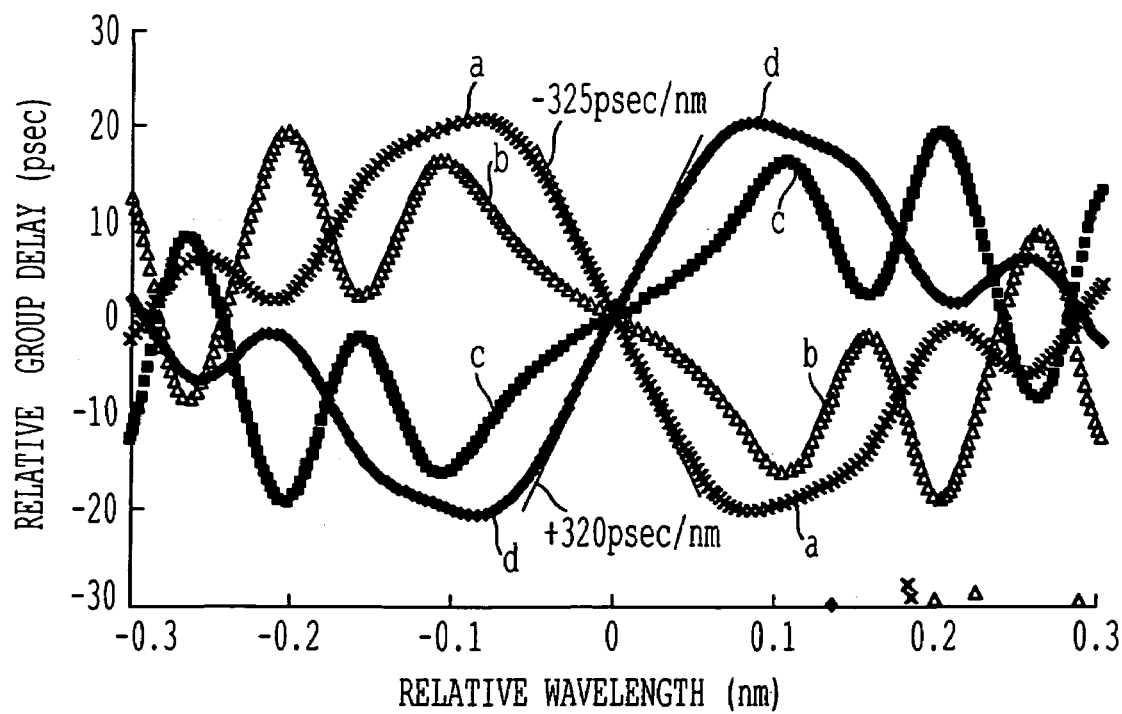
FIG. 14 is a graph showing waveguide dispersion generated by the dispersion compensator according to the embodiment of the present invention.

Further, the characteristic lines (a) to (d) in FIG. 14 shows the dispersion characteristics of the dispersion compensator according to the fourth embodiment. In FIG. 14, also, the characteristic line (a) indicates a case that the coefficient (A) in the formula 4 is +π(rad); the characteristic line (b) indicates a case that the coefficient (A) in the formula 4 is +0.8(rad); the characteristic line (c) indicates a case that the coefficient (A) in the formula 4 is −0.8(rad); and the characteristic line (d) indicates a case that the coefficient (A) in the formula 4 is −π(rad).

In view of the characteristic lines (a) to (d) in FIG. 14, it is found that the wavelength dispersion can be changed from about +320 psec/nm to −325 psec/nm in the dispersion compensator 41 according to the present embodiment. In other words, in the dispersion compensation device according to the present embodiment, the wavelength dispersion of 1000 psec/nm can be compensated by the dispersion compensation optical fiber 40, and the remaining dispersion which has not been able to be compensated can be compensated in the range of about +320 psec/nm to −325 psec/nm by the dispersion compensator 41.

The present invention is not limited to the above described embodiments, and various embodiments can be adopted. For example, although the phase distribution of the arrayed waveguide 4 of the dispersion compensator 41 is set as the quadric function distribution, the sine function distribution, the exponential function distribution, or the liner function distribution, the phase distribution is not specifically limited thereto, and can be adequately set. Namely, the phase distribution can be any distribution as long as the distribution is the even function distribution which is substantially linearly symmetrical with respect to the center of the channel waveguide number.

Also, the parameters of the dispersion compensator 41 are not limited to the specific ones, and can be adequately modified. By setting the parameters of the dispersion compensator 41 adequately, the dispersion compensator 41 having various wavelength dispersion characteristics can be formed, and various dispersion compensation device can be structured.

Further, although the dispersion compensation optical fiber is connected to the input side of the dispersion compensator 41 in the aforementioned embodiments, the dispersion compensation optical fiber can be connected to at least one of the input side and the output side of the dispersion compensator 41, to thereby form the dispersion compensation device.

Figure 15A:
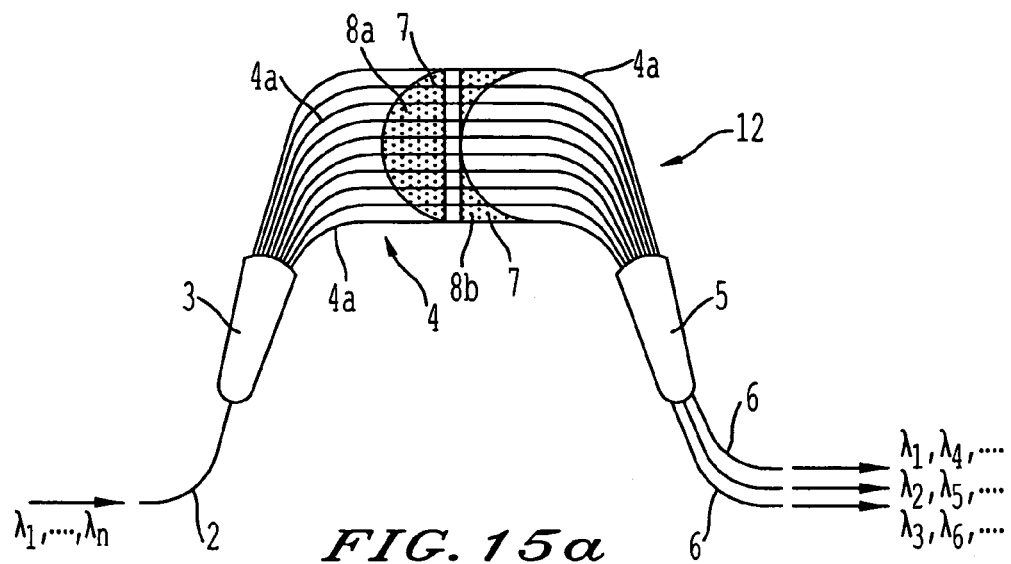
FIGS. 15(a) to 15(c) are explanatory views showing examples of dispersion compensators according to embodiments of the present invention.
Figure 15B:
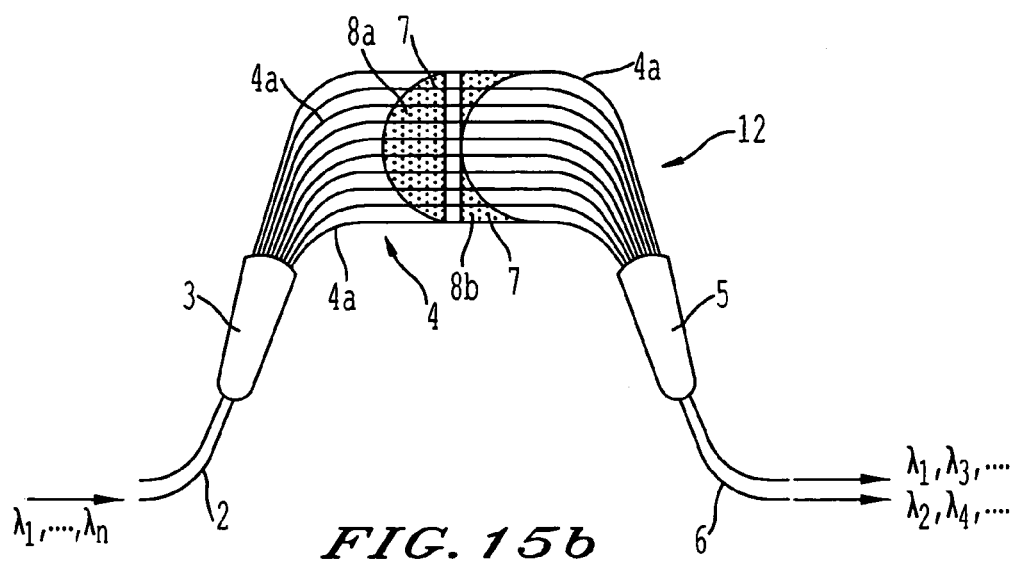
Figure 15C:
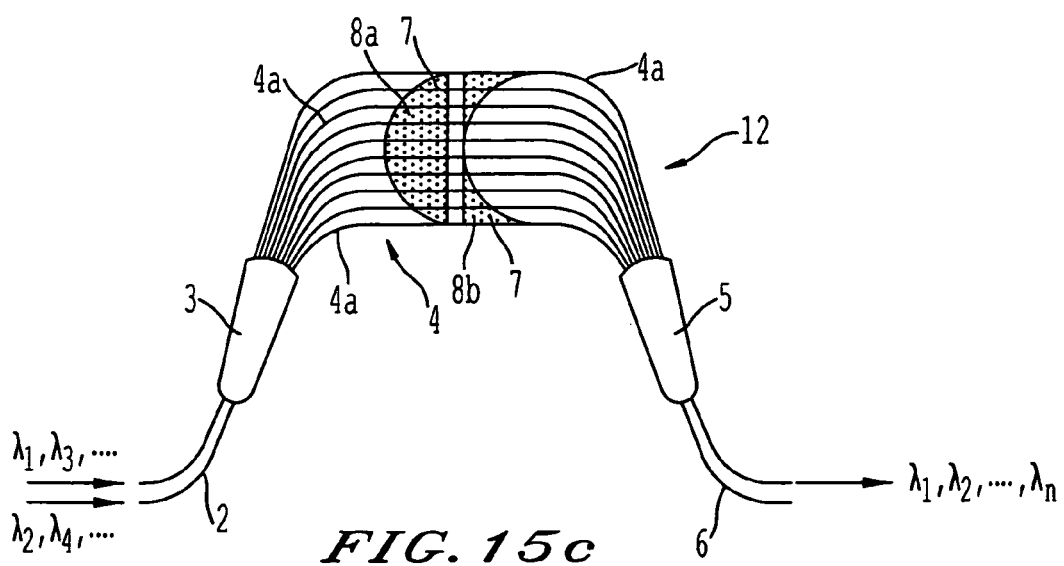
Figure 16:
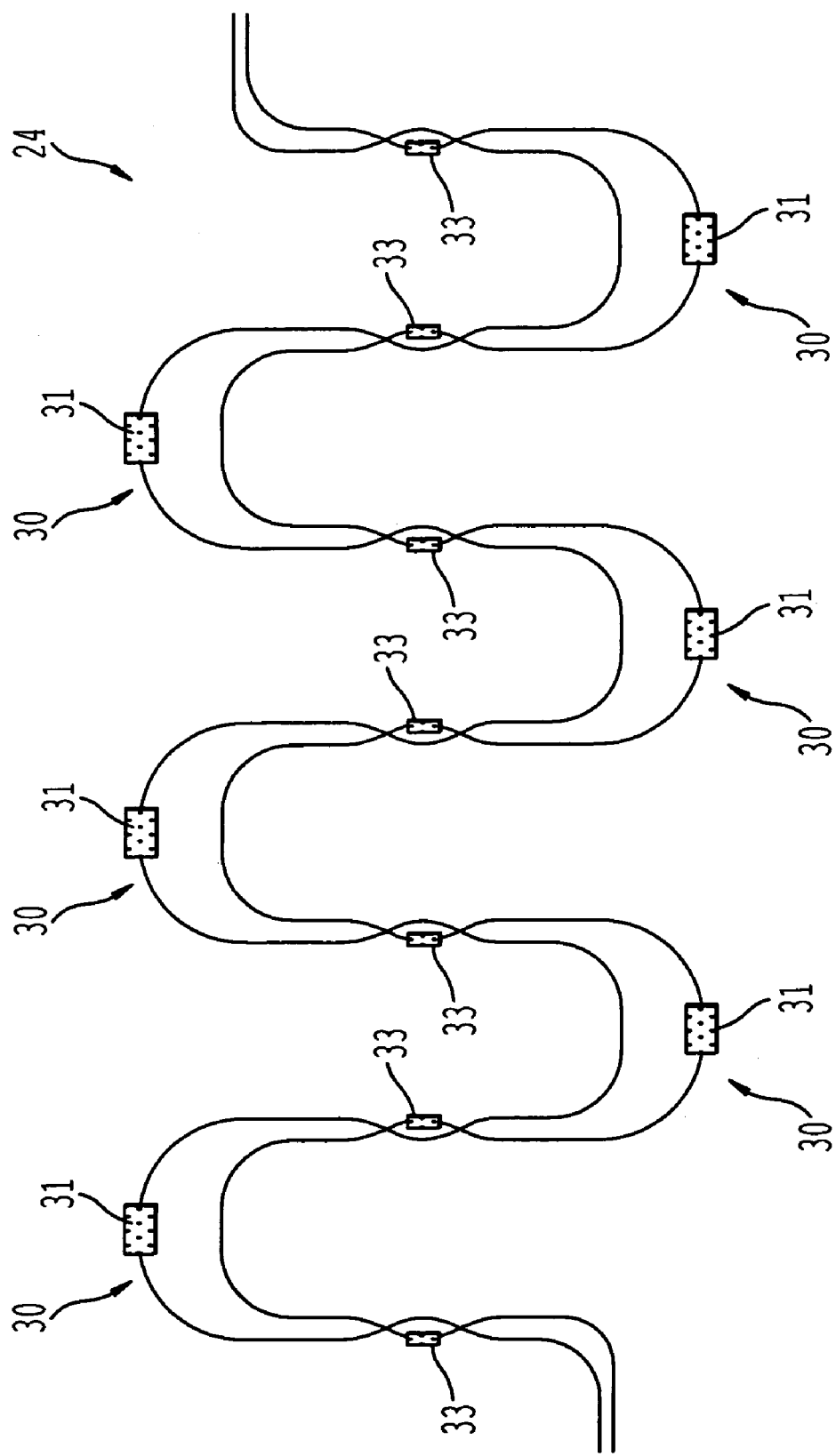
FIG. 16 is an explanatory view showing an example of a conventional dispersion compensator.
Figure 17:
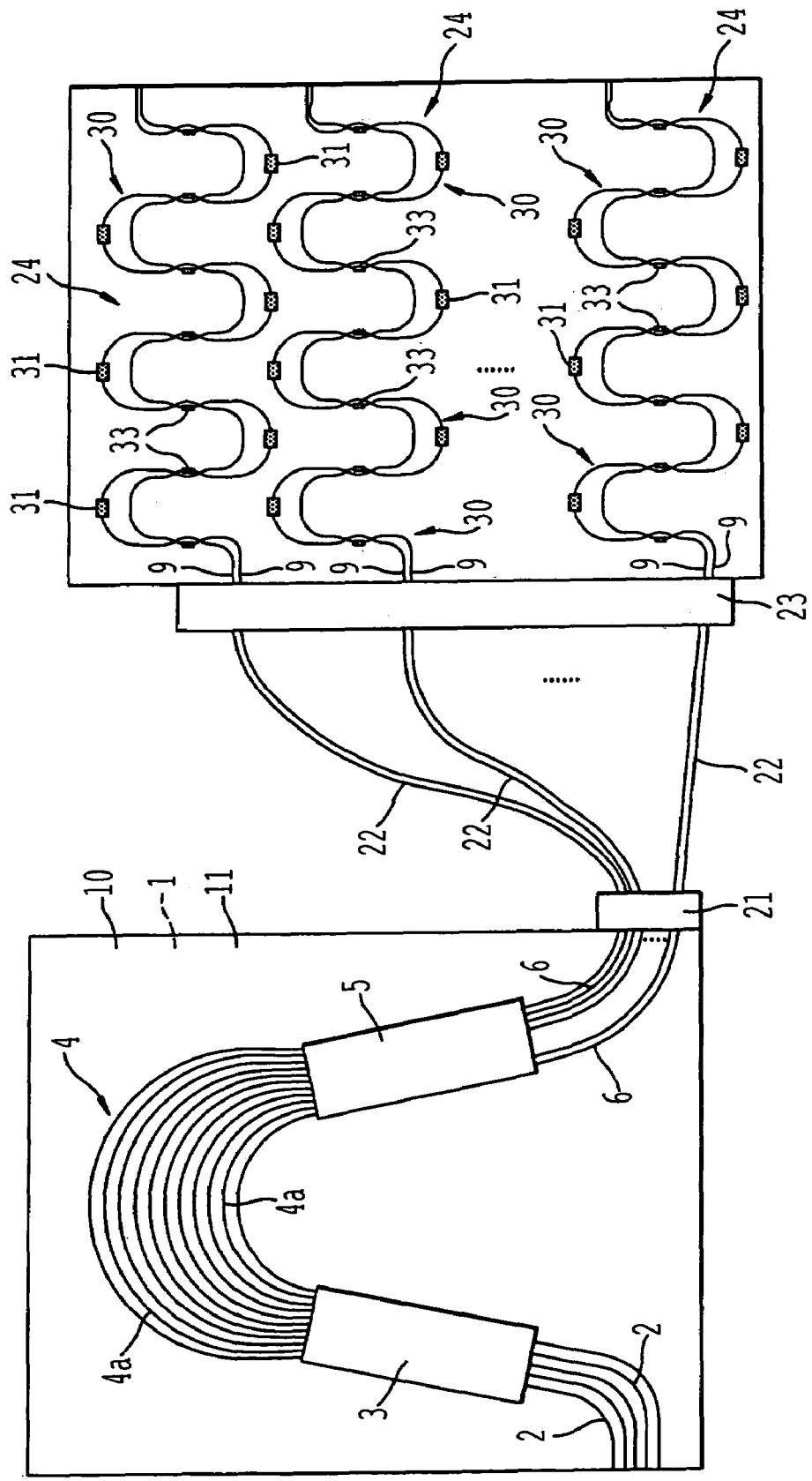
FIG. 17 is an explanatory view showing another example of the conventional dispersion compensator.

Still further, the dispersion compensator 41 applied to the dispersion compensation device of the invention is not limited to the dispersion compensator 41 of the aforementioned embodiments. The dispersion compensator 41 can have a structure including an optical circuit 12 in which at least one of the optical input waveguide 2 and the optical output waveguide 6 has a plurality of the waveguides as shown in FIGS. 15(a) to 15(c), for example.

By combining the dispersion compensation optical fiber 40 and the dispersion compensator 41, the dispersion compensation device according to the embodiments of the present invention can achieve the accurate dispersion compensation technology which can respond to the transmission speed of more than 40 Gbit/s, for example.

Since the dispersion compensator according to the embodiments of the present invention has a structure having the optical circuit and the phase distribution providing section for providing the predetermined phase distribution to the arrayed waveguide of the optical circuit, the wavelength dispersion can be generated by the simple structure, and the wavelength dispersion compensation of the optical transmission path can be conducted.

Also, in the dispersion compensator according to the embodiments of the present invention, according to the structure in which the predetermined phase distribution is set as the even function distribution substantially linearly symmetrical with respect to the center of the channel waveguide number, the adequate wavelength dispersion can be generated by the dispersion compensator. Therefore, the wavelength dispersion compensation of the optical transmission path can be conducted more accurately.

Further, in the dispersion compensator according to the embodiments of the present invention, according to the structure in which the predetermined phase distribution is set as one of the quadric function distribution, the sine function distribution, the exponential function distribution, and the linear function distribution, the aforementioned effect can be achieved by generating the adequate wavelength dispersion by the dispersion compensator.

Also, in the dispersion compensator according to the embodiments of the present invention, according to the structure in which the predetermined phase distribution is variable in the phase distribution providing section, the wavelength dispersion generated by the dispersion compensator can be changed, so that the wavelength dispersion compensation can be conducted more adequately in correspondence to the optical transmission path or the like.

In the dispersion compensator according to the embodiments of the present invention, according to the structure in which the phase distribution providing section has the heating section for heating at least the predetermined region of the arrayed waveguide forming region, by heating the predetermined region of the arrayed waveguide forming region by the heating section, the refractive index of the channel waveguide can be easily adjusted. Thus, the adequate wavelength dispersion can be easily generated.

Further, since the dispersion compensation device according to the embodiments of the present invention is formed by connecting the aforementioned dispersion compensator and the dispersion compensation optical fiber, the majority of the wavelength dispersion of the optical transmission path can be conducted by the dispersion compensation optical fiber and the remaining wavelength dispersion can be slightly adjusted by the dispersion compensator. Therefore, the wavelength dispersion of the optical transmission path can be compensated accurately.

Although in the embodiments described above, the refractive indexes of the plurality of channel waveguides are adjusted by heating the plurality of channel waveguides with heaters, the refractive indexes may be adjusted by other methods and devices.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A dispersion compensator comprising:
   at least one first optical waveguide;
   a first slab waveguide;
   an arrayed waveguide connected to said at least one first optical waveguide via said first slab waveguide, said arrayed waveguide comprising a plurality of channel waveguides each of which has a different length;
   a second slab waveguide;
   at least one second optical waveguide connected to said arrayed waveguide via said second slab waveguide; and
   a phase distribution provider configured to provide a phase distribution to said arrayed waveguide, said phase distribution provider comprising:
   a first refractive index adjuster configured to adjust a refractive index in a first portion of each of the plurality of channel waveguides and configured to provide positive dispersion compensation, and
   a second refractive index adjuster configured to adjust a refractive index in a second portion of each of the plurality of waveguides and configured to provide negative dispersion compensation, wherein for each channel waveguide, the first and second portions are different sizes.

2. A dispersion compensator according to claim 1, wherein said phase distribution provider is configured to provide the phase distribution which is substantially symmetrical with respect to a center line among said plurality of channel waveguides.

3. A dispersion compensator according to claim 1, wherein said phase distribution provider is configured to provide the phase distribution P(k) which substantially satisfies the following expression, $$P(k)=A\{k-(M-1)/2\}^2/\{(M-1)/2\}^2$$

where (A) is a coefficient, (M) is a number of said plurality of channel waveguides, and (k) identifies one of said plurality of channel waveguides and is from zero to (M−1).

4. A dispersion compensator according to claim 1, wherein said phase distribution provider is configured to provide the phase distribution P(k) which substantially satisfies the following expression, $$P(k)=A\{1+\sin(-k\pi/M)\}$$

where (A) is a coefficient, (M) is a number of said plurality of channel waveguides, and (k) identifies one of said plurality of channel waveguides and is from zero to (M−1).

5. A dispersion compensator according to claim 1, wherein said phase distribution provider is configured to provide the phase distribution P(k) which substantially satisfies the following expression, $$P(k)=A(\exp[-\{k-(M-1)/2\}/4]+\exp[\{k-(M-1)/2\}/4])/[\exp\{(M-1)/8\}+\exp\{-(M-1)/8\}]$$

where (A) is a coefficient, (M) is a number of said plurality of channel waveguides, and (k) identifies one of said plurality of channel waveguides and is from zero to (M−1).

6. A dispersion compensator according to claim 1, wherein said phase distribution provider is configured to provide the phase distribution P(k) which substantially satisfies the following expression, $$P(k)=A*[-k/\{(M-1)/2\}]+1*$$

where (A) is a coefficient, (M) is a number of said plurality of channel waveguides, and (k) identifies one of said plurality of channel waveguides and is from zero to (M−1).

7. A dispersion compensator according to claim 1, wherein said phase distribution provider is configured to provide the phase distribution P(k) which is variable.

8. A dispersion compensator according to claim 1, wherein at least one of said first and second refractive index adjusters comprises a heater configured to heat said plurality of channel waveguides.

9. A dispersion compensator according to claim 8, wherein said heater is provided to be substantially symmetrical with respect to a center line among said plurality of channel waveguides.

10. A dispersion compensator according to claim 8, wherein said heater extends along each of said plurality of channel waveguides, a maximum length (L) of said heater extending along each of said plurality of channel waveguides satisfies the following expression, $$\Phi_{shift}=\{(2\pi/\lambda)(dn/dT)\Delta T\}L$$

where ($\Phi_{shift}$) is a phase shift amount, ($\lambda$) is a wavelength, (n) is a refractive index of said channel waveguides, (T) is a temperature of said heater, ($\Delta T$) is a temperature change of said heater.

11. A dispersion compensator according to claim 1, wherein:
said first refractive index adjuster comprises a first heater configured to function as a phase shifter for a positive dispersion compensation; and
said second refractive index adjuster comprises a second heater configured to function as a phase shifter for a negative dispersion compensation.

12. A dispersion compensator according to claim 11, wherein said first and second heaters are provided to be substantially symmetrical with respect to a center line among said plurality of channel waveguides.

13. A dispersion compensator according to claim 12, wherein said first heater extends along each of said plurality of channel waveguides, a length of said first heater extending along each of said plurality of channel waveguides increasing toward the center line.

14. A dispersion compensator according to claim 12, wherein said second heater extends along each of said plurality of channel waveguides, a length of said second heater extending along each of said plurality of channel waveguides decreasing toward the center line.

15. A dispersion compensator according to claim 8, wherein said heater is an electrical heater.

16. A dispersion compensator according to claim 15, wherein said heater is made of Cr, TiNi, or TaN.

17. A dispersion compensator according to claim 15, further comprising:
an electric power supply controller configured to control electric power supply to said electrical heater to adjust the phase distribution.

18. A method for manufacturing a dispersion compensator, comprising:
forming a circuit pattern on a core film, said circuit pattern comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
at least one second optical waveguide connected to said arrayed waveguide via said second slab waveguide;
forming an over-clad film on said core film;
forming a heater on said over-clad film over said arrayed waveguide said heater comprising:
a first heater configured to adjust a refractive index in a first portion of each of the plurality of channel waveguides and configured to provide positive dispersion compensation, and
a second heater configured to adjust a refractive index in a second portion of each of the plurality of waveguides and configured to provide negative dispersion compensation, wherein for each channel waveguide, the first and second portions are different sizes.

19. A method according to claim 18, further comprising:
forming an under-clad film on a silicon substrate; and
forming a core film on said under clad-film.

20. A method according to claim 19, the under-clad film and the core film are formed by using a flame hydrolysis deposition method.

21. A method according to claim 18, the over-clad film is formed by using a flame hydrolysis deposition method.

22. A method according to claim 18, the heater is formed by transferring a photomask pattern using a photolithography or a reactive ion etching.

23. A dispersion compensator comprising:
a substrate;
a circuit pattern formed on said substrate, said circuit pattern comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide; and
at least one second optical waveguide connected to said arrayed waveguide via said second slab waveguide;

an over-clad film formed on said substrate to cover said circuit pattern; and a phase distribution provider which is provided on said over-clad film over said arrayed waveguide and which is configured to provide a phase distribution to said arrayed waveguide, said phase distribution provider comprising:

a first refractive index adjuster configured to adjust a refractive index in a first portion of each of the plurality of channel waveguides and configured to provide positive dispersion compensation, and a second refractive index adjuster configured to adjust a refractive index in a second portion of each of the plurality of waveguides and configured to provide negative dispersion compensation, wherein for each channel waveguide, the first and second portions are different sizes.

24. A dispersion compensator according to claim 23, wherein said substrate is a silicon substrate.

25. A dispersion compensator according to claim 23, further comprising:

an under-clad film formed on the substrate; and a core film which is formed on said under-clad film and on which said circuit pattern is formed.

26. A dispersion compensator according to claim 23, wherein said phase distribution provider is configured to provide the phase distribution which is substantially symmetrical with respect to a center line among said plurality of channel waveguides.

27. A dispersion compensator according to claim 23, wherein said phase distribution provider is configured to provide the phase distribution P(k) which substantially satisfies the following expression, $$P(k)=A\{k-(M-1)/2\}^2/\{(M-1)/2\}^2$$

where (A) is a coefficient, (M) is a number of said plurality of channel waveguides, and (k) identifies one of said plurality of channel waveguides and is from zero to (M−1).

28. A dispersion compensator according to claim 23, wherein said phase distribution provider is configured to provide the phase distribution P(k) which substantially satisfies the following expression, $$P(k)=A\{1+\sin(-k\pi/M)\}$$

where (A) is a coefficient, (M) is a number of said plurality of channel waveguides, and (k) identifies one of said plurality of channel waveguides and is from zero to (M−1).

29. A dispersion compensator according to claim 23, wherein said phase distribution provider is configured to provide the phase distribution P(k) which substantially satisfies the following expression, $$P(k)=A(\exp[-\{k-(M-1)/2\}/4]+\exp[\{k-(M-1)/2\}/4])/[\exp\{(M-1)/8\}+\exp\{-(M-1)/8\}]$$

where (A) is a coefficient, (M) is a number of said plurality of channel waveguides, and (k) identifies one of said plurality of channel waveguides and is from zero to (M−1).

30. A dispersion compensator according to claim 23, wherein said phase distribution provider is configured to provide the phase distribution P(k) which substantially satisfies the following expression, $$P(k)=A*[-k/\{(M-1)/2\}]+1$$

where (A) is a coefficient, (M) is a number of said plurality of channel waveguides, and (k) identifies one of said plurality of channel waveguides and is from zero to (M−1).

31. A dispersion compensator according to claim 23, wherein said phase distribution provider is configured to provide the phase distribution P(k) which is variable.

32. A dispersion compensator according to claim 23, wherein at least one of said first and second refractive index adjusters comprises a heater configured to heat said plurality of channel waveguides.

33. A dispersion compensator according to claim 32, wherein said heater is provided to be substantially symmetrical with respect to a center line among said plurality of channel waveguides.

34. A dispersion compensator according to claim 32, wherein said heater extends along each of said plurality of channel waveguides, a maximum length (L) of said heater extending along each of said plurality of channel waveguides satisfies the following expression, $$\Phi_{shift}=\{(2\pi/\lambda)(dn/dT)\Delta T\}L$$

where ($\Phi_{shift}$) is a phase shift amount, ($\lambda$) is a wavelength, (n) is a refractive index of said channel waveguides, (T) is a temperature of said heater, ($\Delta T$) is a temperature change of said heater.

35. A dispersion compensator according to claim 23, wherein:

said first refractive index adjuster comprises a first heater configured to function as a phase shifter for a positive dispersion compensation; and said second refractive index adjuster comprises a second heater configured to function as a phase shifter for a negative dispersion compensation.

36. A dispersion compensator according to claim 35, wherein said first and second heaters are provided to be substantially symmetrical with respect to a center line among said plurality of channel waveguides.

37. A dispersion compensator according to claim 36, wherein said first heater extends along each of said plurality of channel waveguides, a length of said first heater extending along each of said plurality of channel waveguides increasing toward the center line.

38. A dispersion compensator according to claim 36, wherein said second heater extends along each of said plurality of channel waveguides, a length of said second heater extending along each of said plurality of channel waveguides decreasing toward the center line.

39. A dispersion compensator according to claim 32, wherein said heater is an electrical heater.

40. A dispersion compensator according to claim 39, wherein said heater is made of Cr, TiNi, or TaN.

41. A dispersion compensator according to claim 39, further comprising:

an electric power supply controller configured to control electric power supply to said electrical heater to adjust the phase distribution.

42. A method for compensating wavelength dispersion in an optical transmission path, comprising:

providing a dispersion compensator comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length;

a second slab waveguide;

at least one second optical waveguide connected to said arrayed waveguide via said second slab waveguide; and providing a phase distribution to said arrayed waveguide by providing:

a first refractive index adjuster configured to adjust a refractive index in a first portion of each of the plurality of channel waveguides and configured to provide positive dispersion compensation, and a second refractive index adjuster configured to adjust a refractive index in a second portion of each of the plurality of waveguides and configured to provide negative dispersion compensation, wherein for each channel waveguide, the first and second portions are different sizes.

43. A dispersion compensator comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length;

a second slab waveguide;

at least one second optical waveguide connected to said arrayed waveguide via said second slab waveguide;

means for providing a first phase distribution to said arrayed waveguide; and means for providing a second phase distribution to said arrayed waveguide, wherein said first phase distribution is different from said second phase distribution.

44. A method according to claim 18, the circuit pattern is formed by transferring a photomask circuit pattern using a photolithography or a reactive ion etching.

45. The dispersion compensator of claim 1, wherein a size of each first portion varies across the plurality of waveguides according to a convex function, and a size of each second portion varies across the plurality of waveguides according to a concave function.

46. The dispersion compensator of claim 1, wherein a size and position of each first portion is selected such that said first refractive index adjuster has a convex outline, and a size and position of each second portion is selected such that said second refractive index adjuster has a concave outline.

47. The method of claim 18, wherein a size of each first portion varies across the plurality of waveguides according to a convex function, and a size of each second portion varies across the plurality of waveguides according to a concave function.

48. The method of claim 18, wherein a size and position of each first portion is selected such that said first refractive index adjuster has a convex outline, and a size and position of each second portion is selected such that said second refractive index adjuster has a concave outline.

49. The dispersion compositor of claim 23, wherein a size of each first portion varies across the plurality of waveguides according to a convex function, and a size of each second portion varies across the plurality of waveguides according to a concave function.

50. The dispersion compositor of claim 23, wherein a size and position of each first portion is selected such that said first refractive index adjuster has a convex outline, and a size and position of each second portion is selected such that said second refractive index adjuster has a concave outline.

51. The method of claim 42, the dispersion compensator of claim 1, wherein a size of each first portion varies across the plurality of waveguides according to a convex function, and a size of each second portion varies across the plurality of waveguides according to a concave function.

52. The method of claim 42, wherein a size and position of each first portion is selected such that said first refractive index adjuster has a convex outline, and a size and position of each second portion is selected such that said second refractive index adjuster has a concave outline.

* * * * *